United States Patent
Sugaya et al.

(10) Patent No.: US 7,570,566 B2
(45) Date of Patent: Aug. 4, 2009

(54) OPTICAL DISC, OPTICAL DISC MANUFACTURING METHOD, AND OPTICAL DISC APPARATUS

(75) Inventors: Toshihiro Sugaya, Moriya (JP); Masato Otsuka, Tokyo (JP); Naomasa Nakamura, Yokohama (JP); Nobuhisa Yoshida, Kamakura (JP); Hisashi Yamada, Yokohama (JP)

(73) Assignees: Kabushiki Kaisha Toshiba, Tokyo (JP); Memory-Tech Corporation, Chikusei (JP)

( * ) Notice: Subject to any disclaimer, the term of this patent is extended or adjusted under 35 U.S.C. 154(b) by 539 days.

(21) Appl. No.: 11/504,580

(22) Filed: Aug. 16, 2006

(65) Prior Publication Data
US 2007/0042294 A1    Feb. 22, 2007

(30) Foreign Application Priority Data
Aug. 18, 2005    (JP) ............................. 2005-237742

(51) Int. Cl.
*G11B 3/74*    (2006.01)
(52) U.S. Cl. ........................................ 369/94; 369/283
(58) Field of Classification Search ........................ None
See application file for complete search history.

(56) References Cited

U.S. PATENT DOCUMENTS 5,764,621 A * 6/1998 Choi ........................... 369/286

FOREIGN PATENT DOCUMENTS

| JP | 10-40574 | 2/1998 |
|---|---|---|
| JP | 11-134710 | 5/1999 |
| JP | 11-232700 | 8/1999 |
| JP | 2001-176129 | 6/2001 |
| JP | 2005-63518 | 3/2005 |

OTHER PUBLICATIONS 120 mm DVD—Read-Only Disk, Standard ECMA-267, $3^{rd}$ Edition, Apr. 2001, 92 pages.

* cited by examiner

*Primary Examiner*—Paul Huber
(74) *Attorney, Agent, or Firm*—Oblon, Spivak, McClelland, Maier & Neustadt, P.C.

(57) ABSTRACT

According to one embodiment, an optical disc is the following the distance between a light incidence plane and the first recording layer is a minimum of 550 μm. The distance between the first and the third recording layer is a maximum of 72 μm. The distance between the second and the third recording layer is a minimum of 15 μm. The distance between the first and the second recording layer is about 31 to 40 μm. The reflectivities of the first and the second recording layer with respect to the first laser beam range from 18 to 27%, and the ratio therebetween is about 1.1 or less. The reflectivity of the third recording layer is below about 6%. The areal recording density of the third recording layer is three times or more as high as that of the first recording layer and the second recording layer.

5 Claims, 22 Drawing Sheets

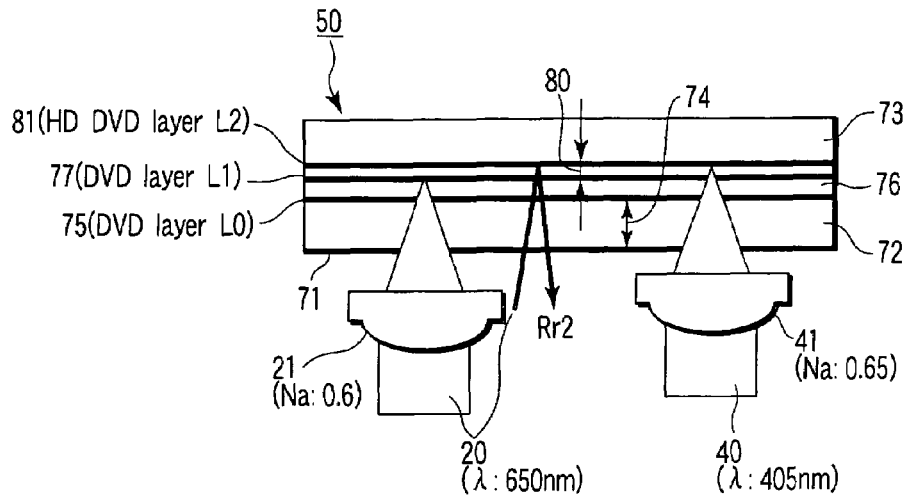
F I G. 7
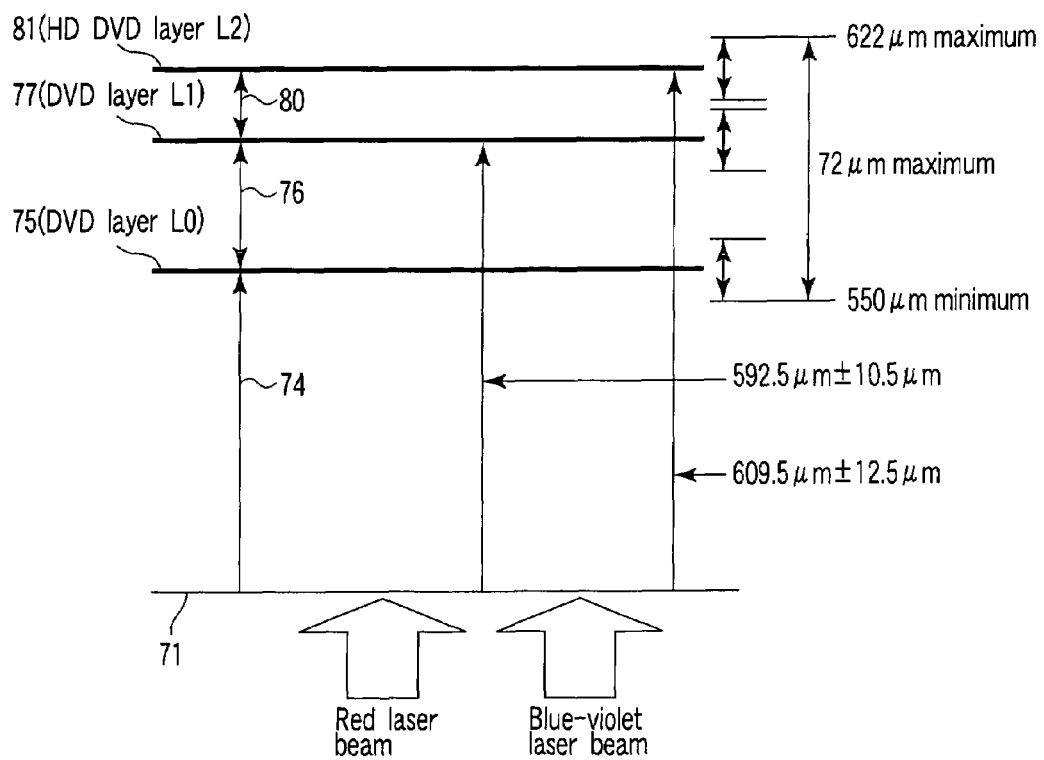
F I G. 8

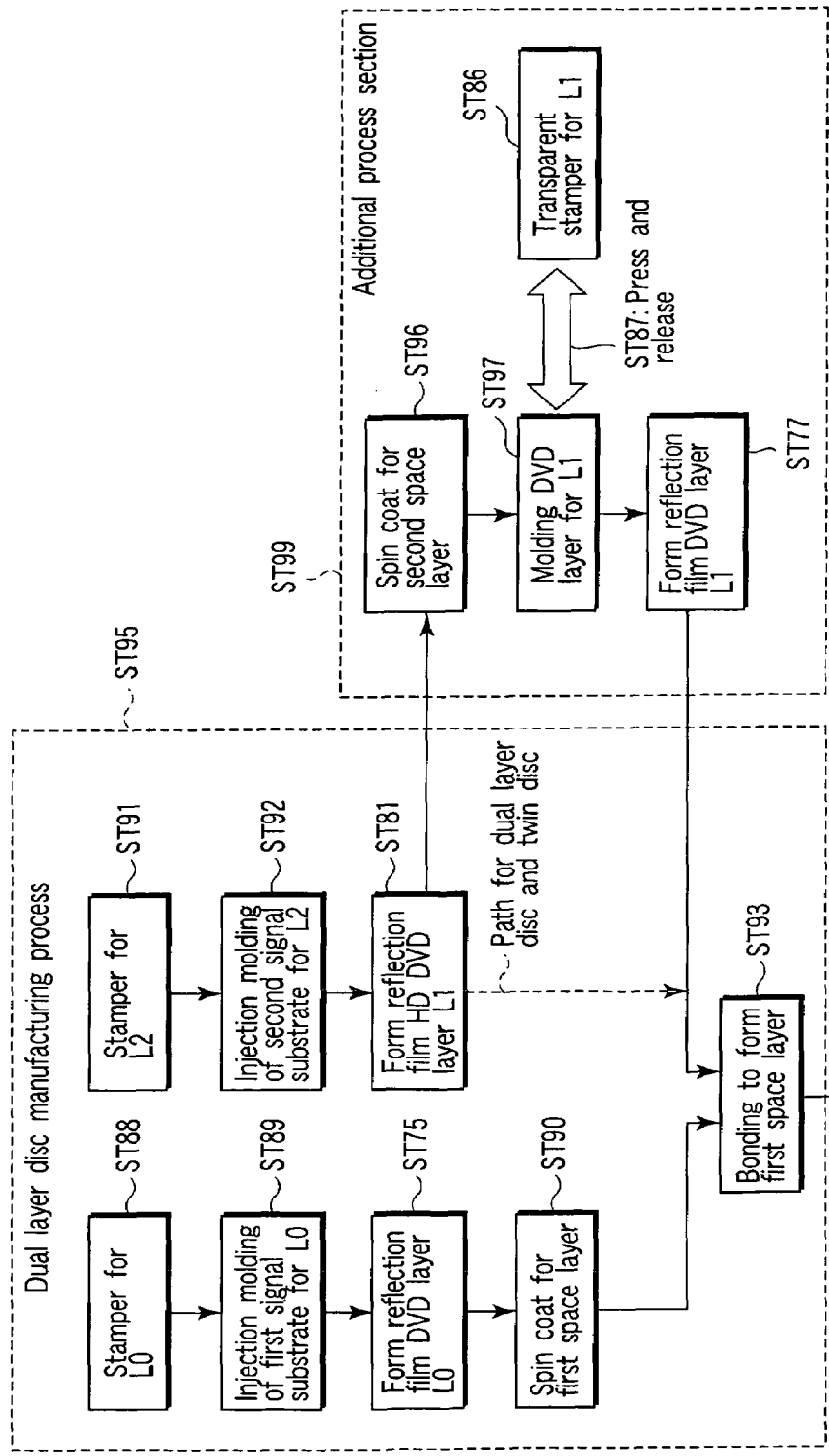
F I G. 10

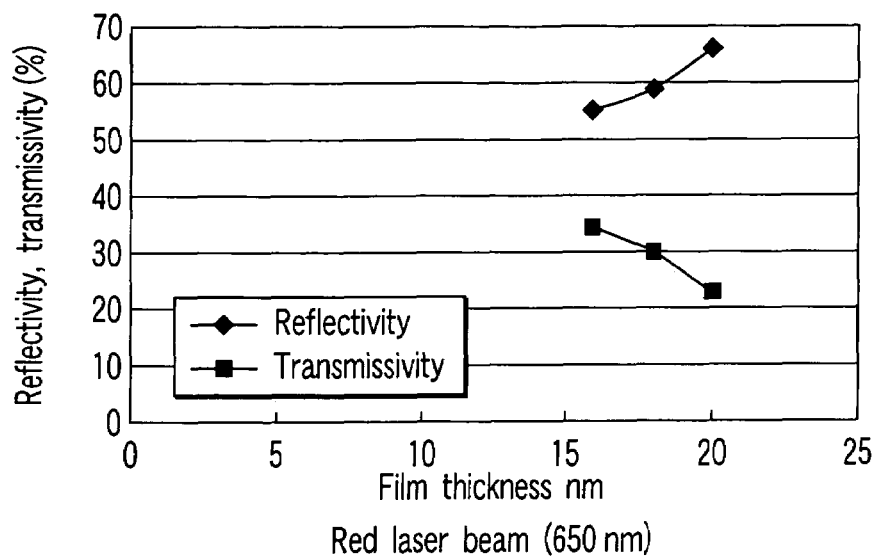
Red laser beam (650 nm)
F I G. 11A
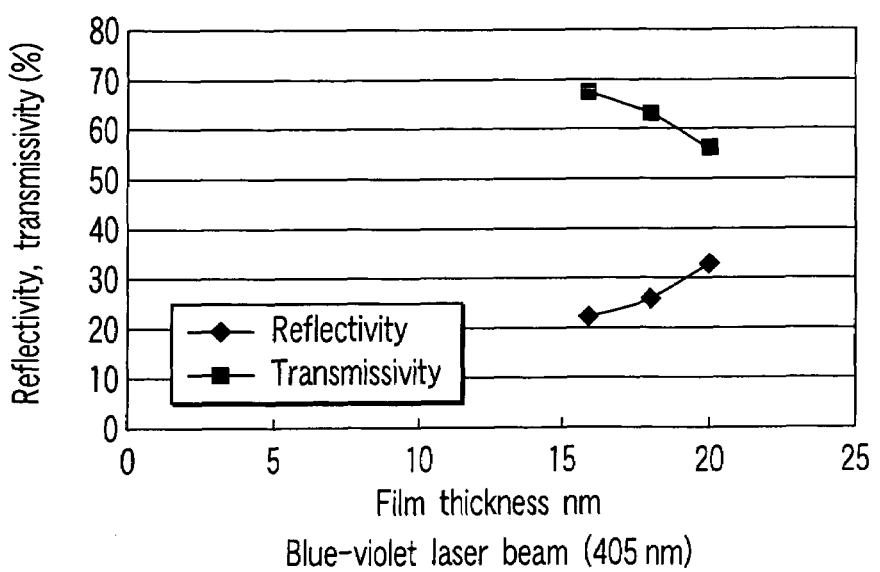
Blue-violet laser beam (405 nm)
F I G. 11B

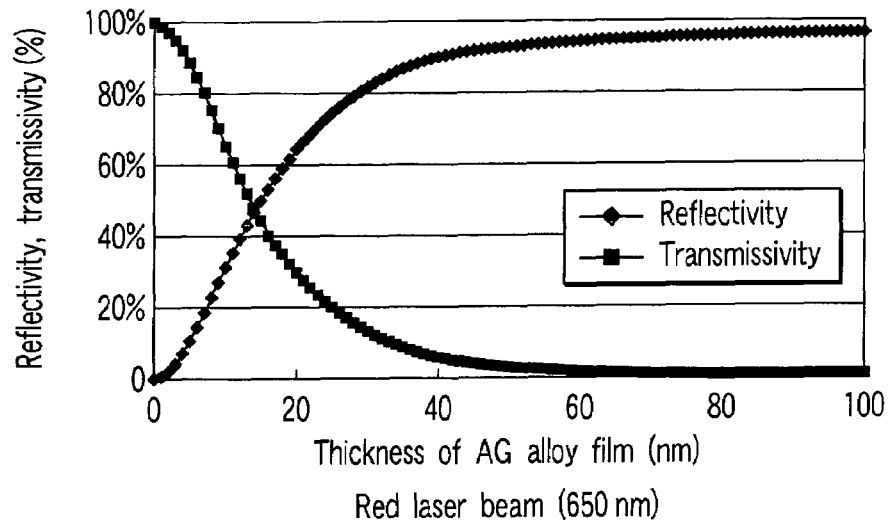
Red laser beam (650 nm)
F I G. 12A
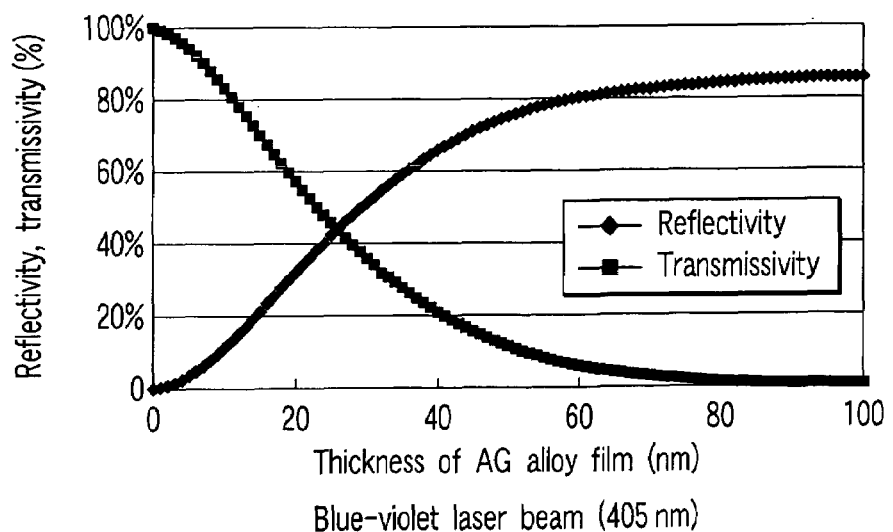
Blue-violet laser beam (405 nm)
F I G. 12B

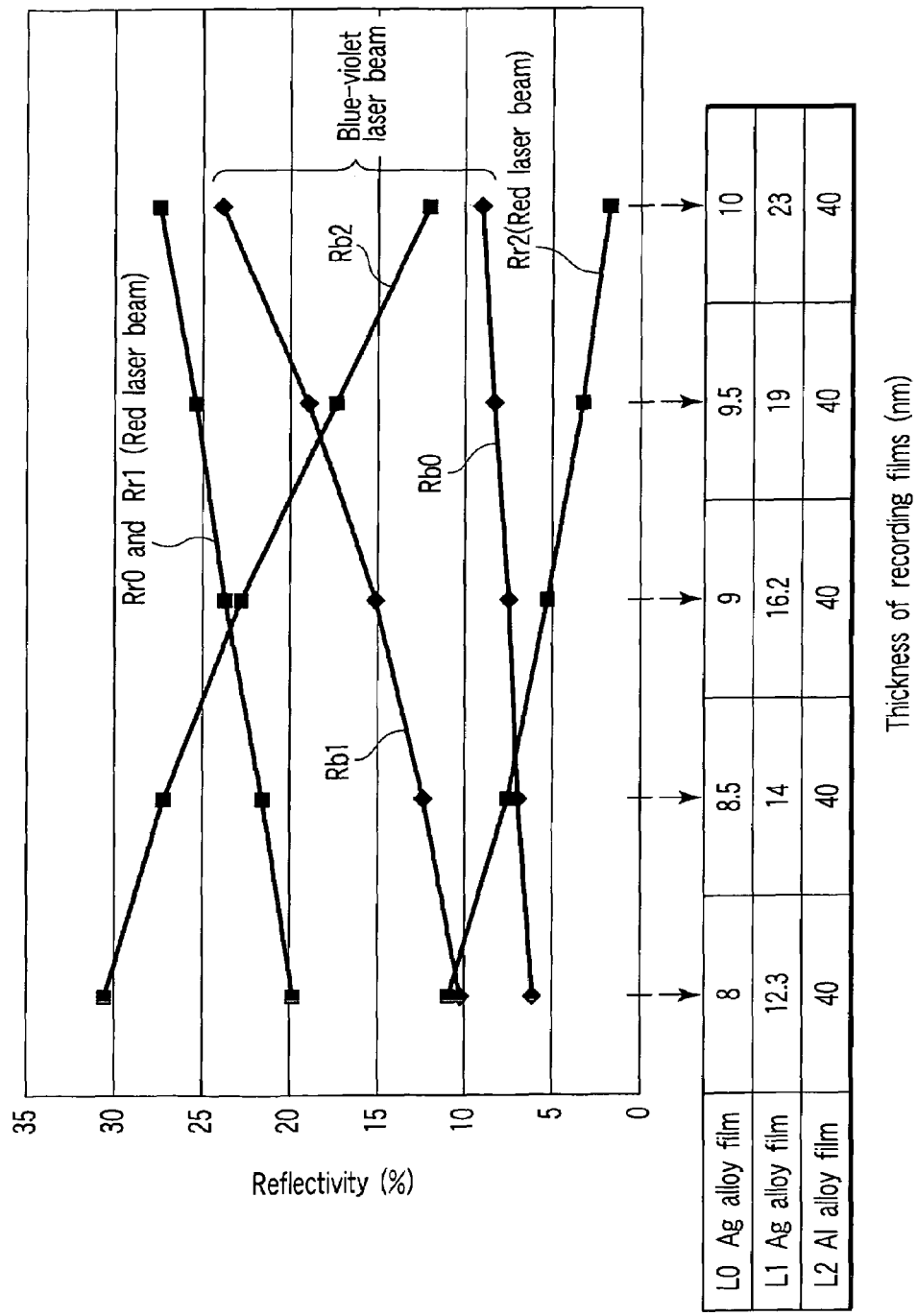
F I G. 15

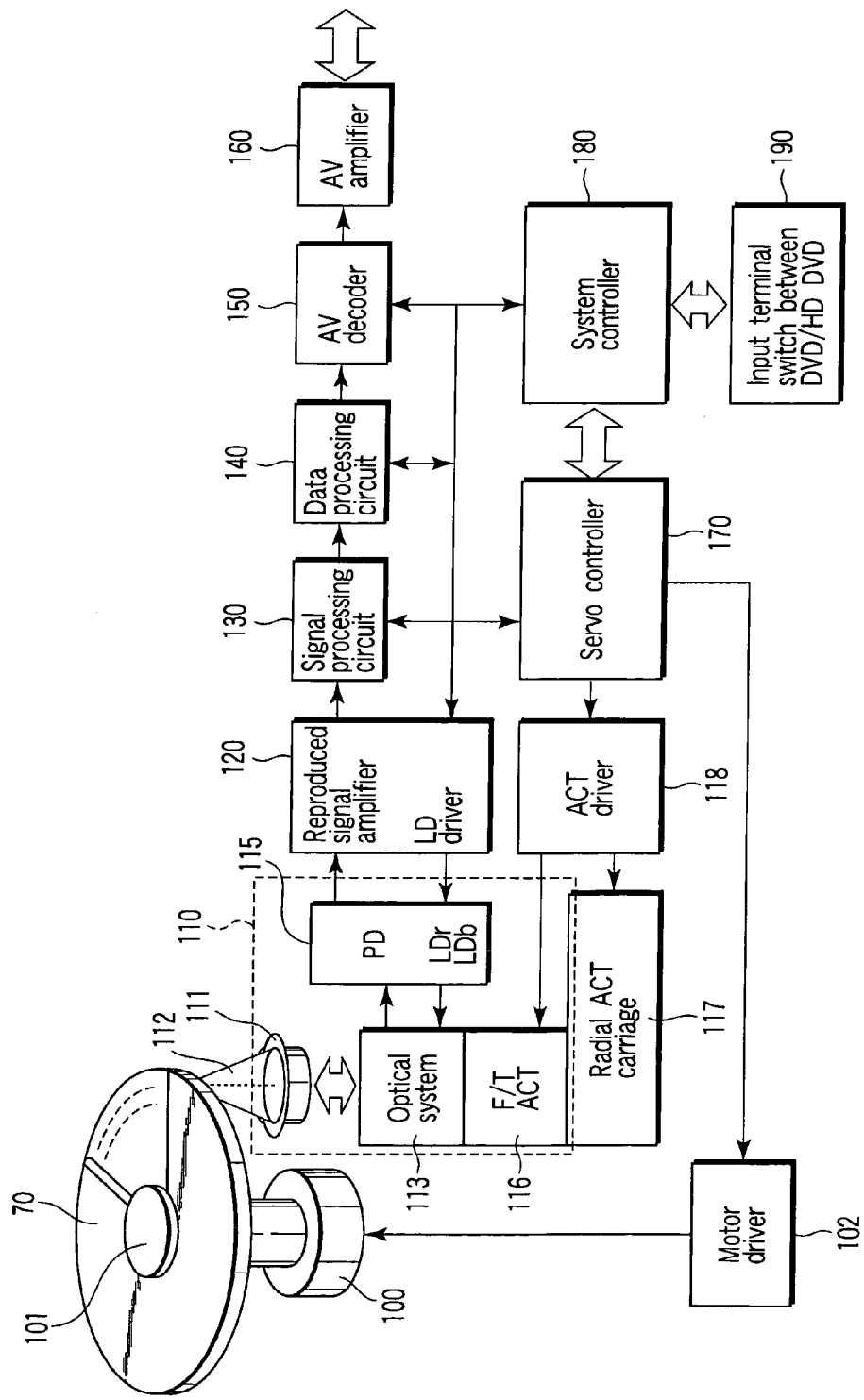
F I G. 26

OPTICAL DISC, OPTICAL DISC MANUFACTURING METHOD, AND OPTICAL DISC APPARATUS

CROSS-REFERENCE TO RELATED APPLICATIONS

This application is based upon and claims the benefit of priority from Japanese Patent Application No. 2005-237742, filed Aug. 18, 2005, the entire contents of which are incorporated herein by reference.

BACKGROUND

1. Field

One embodiment of the invention relates to an optical disc such as a DVD which serves as a medium to store digitized video and audio works such as movies and music. It further relates to an optical disc apparatus which reads information recorded on the optical disc and to an optical disc manufacturing method. Still further, it covers a digital work publication recorded on a recording medium.

2. Description of the Related Art

<Outline of the DVD Standard>

One known type of optical disc for storing digital images is the Digital Versatile Disc (DVD), which has been widely used all over the world mainly for storing and delivering movie content (digital work publications). DVD is a format created by the DVD Forum, which is open to the public as the DVD Book (refer to the World Wide Web: dvdforum.org). DVD has also been determined in international standards and JIS. Here, the international standard ISO/IEC 16448 for 120 mm DVD-ROM, one of the DVD physical formats, will be briefly explained. Moreover, ECMA-267 is a document associated with the international standards.

There are four types of 120 mm DVD-ROM: single-sided single layer, single-sided dual layer, double-sided single layer, and double-sided dual layer. In delivery of an accumulation of contents of movies and the like, two types of single-sided discs are mainly used: one is a single-sided single layer DVD disc (4.7 GB) and the other is a single-sided dual layer DVD disc (8.54 GB). However, recently, the single-sided dual layer DVD disc has accounted for 60% of the total.

On the other hand, the development of a disc whose capacity is larger than that of the aforementioned DVD (referred to as the existing DVD) has been desired. This comes from a desire to store High-Definition (HD) images on a single disc (temporarily referred to as a next-generation DVD).

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 7 is an exemplary diagram showing the relationship between the basic structure of an optical disc and an optical head;

FIG. 8 is an exemplary diagram showing the position of the recording layers of the optical disc;

FIG. 10 is an exemplary diagram showing a process of manufacturing of an optical disc;

FIGS. 11A and 11B are diagrams showing actual measurement values of the reflectivity and transmissivity of an AG alloy film;

FIGS. 12A and 12B are diagrams showing calculated values of the reflectivity and transmissivity of the Ag alloy film;

FIG. 15 is an exemplary diagram showing the reflectivities (without birefringence) of the layers when the thickness of a (L0) layer is changed;

FIG. 26 is an exemplary diagram showing the configuration of an HD DVD/DVD compatible player complying with the optical disc.

DETAILED DESCRIPTION

Figure 1:
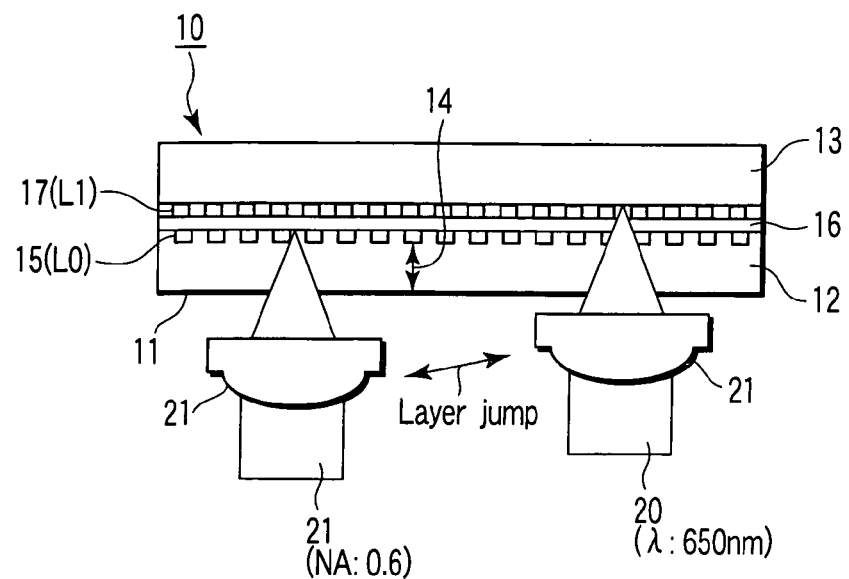
FIG. 1 is an exemplary diagram showing the relationship between the basic structure of a single-sided dual layer DVD disc and an optical head.

Various embodiments according to the invention will be described hereinafter with reference to the accompanying drawings.

If a next-generation DVD is developed, a conventional DVD device (drive or player) cannot read data from the next-generation DVD since the next-generation DVD is substantially different from the existing DVD in recording density, modulation system, signal processing, track format, and the like. That is, the conventional DVD device has the disadvantage of being unable to read conventional DVD movie content recorded on the next-generation DVD disc as well as high-definition movie content recorded on the next-generation DVD disc, which may lead to a factor that hinders the spread of the next-generation DVD.

Furthermore, since single-sided dual layer DVD discs account for 60% of all the existing DVD discs, there is a desire for a new next-generation disc which can be treated as the single-sided dual layer DVD disc is treated.

Thus, in this embodiment, there are provided an optical disc, an optical disc manufacturing method and an optical disc apparatus which enable a single disc to deal with not only information (content) in an HD DVD but also information (content) in a single-sided dual layer DVD.

In this embodiment, a single-sided triple layer optical disc is provided which comprises: a light transmission layer; a first recording layer and a second recording layer which are accessed with a first laser beam; and a third recording layer which is accessed with a second laser beam, and these layers are arranged in that order in a direction in which the laser beams enter. The single-sided triple layer optical disc is basically characterized as follows: The first recording layer is positioned a minimum of 550 μm from a light incidence plane. The distance between the first recording layer and the third recording layer is a maximum of 72 μm. The distance between the second recording layer and the third recording layer is a minimum of 15 μm. The distance between the first recording layer and the second recording layer is about 31 to 40 μm. The reflectivities of the first recording layer and the second recording layer with respect to the first laser beam range from 18 to 27%, and the ratio therebetween is about 1.1 or less. The reflectivity of the third recording layer with respect to the first laser beam is below about 6%. The areal recording density of the third recording layer is three times or more as high as the areal recording density of the first recording layer and the second recording layer.

Hereinafter, referring to the drawings, the embodiments of the present invention will be explained. To make it easier to understand the present invention, the technologies of the existing DVD and the next-generation DVD will be explained using FIGS. 1 to 6. Then, the basic configuration of a next-generation DVD according to the present invention will be explained using FIG. 7.

<Single-Sided Dual Layer DVD>

FIG. 1 shows the relationship between the basic structure of a single-sided dual layer DVD disc 10 and an optical head. As is well known, this disc has a DVD layer (L0) 15 and a DVD layer (L1) 17. The two DVD layers can be accessed from one side of the disc, thereby reproducing a signal. As shown in FIG. 1, when viewed from a light incidence plane 11, there are a light transmission layer 14, the DVD layer (L0) 15, and the DVD layer (L1) 17 in that order. The individual DVD layers are accessed by moving an objective lens 21 under the control of a lens actuator and performing an layer jump.

The dual layer disc is mainly characterized in that it can be produced in about the same manner as a single-sided single layer DVD disc. First, there are separately produced, by use of an injection molding machine, an L0 substrate 12 where the DVD layer (L0) 15 is formed, and an L1 substrate 13 where the DVD layer (L1) 17 is formed. Next, a low reflection film is formed to the DVD layer (L0) 15, and a high-reflectivity film is formed to the DVD layer (L1) 17. Then, the two substrates are bonded together with an space layer 16 in such a manner that the DVD layers lie between the two substrates, which completes the disc. It is to be noted that a spiral direction of a track formed in the L1 substrate 13 is opposite to a spiral direction of a track formed in the L0 substrate 12, but after the bonding, they are in the same direction when viewed from the light incidence plane 11.

Figure 2:
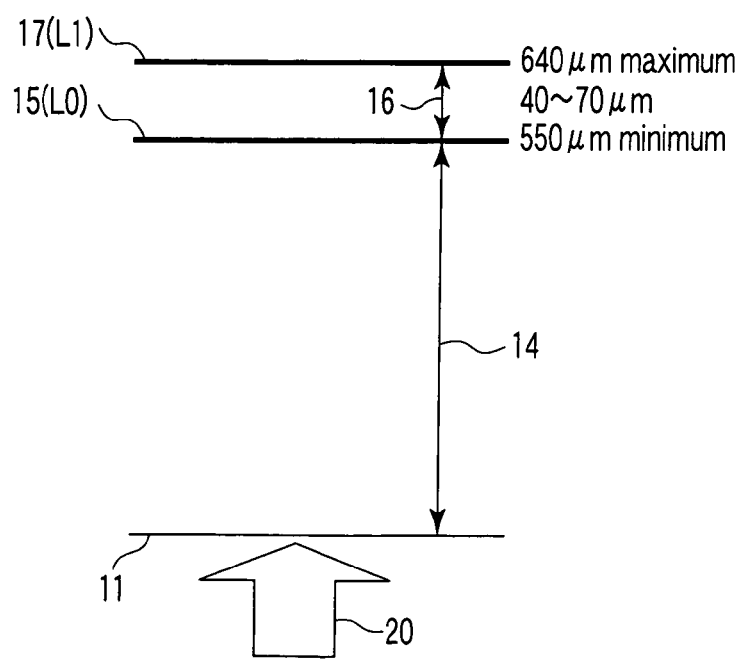
FIG. 2 is an exemplary diagram showing the position of the recording layers of the single-sided dual layer DVD disc.

FIG. 2 shows the position of the DVD layers when viewed from the light incidence plane 11 of the single-sided dual layer DVD disc. The DVD layer (L0) 15 is limited to a position a minimum of 550 μm away from the light incidence plane, and the DVD layer (L1) 17 is limited to a position a maximum of 640 μm away from the light incidence plane, taking into account the spherical aberration of the objective lens and crosstalk between the DVD layers. The distance between the two layers (space layer 16) is set at 40 to 60 μm in terms of layer crosstalk. The space layer 16 is generally equal to the thickness of an adhesive layer with which the two substrates are bonded together. In actual manufacture, the distance is determined, taking into the account the bonding accuracy and the formation accuracy of the L0 substrate 12. It is to be noted that the linear recording density is reduced by 10% in a single-sided single layer DVD disc and the capacity per layer is 4.27 GB. Jitter is determined to be below 8.0%.

On the other hand, the reflectivities of the DVD layers are determined as follows:

Single-layer disc: 45% to 85% (with PBS)

Dual layer disc: 18% to 30% (with PBS)

Identification information indicating the reflectivity, layer structure and the like of the disc is in Identification Data (ID) of a data frame and in Physical Format Information (PFI) in a Control Data Zone (CDZ) located in a Lead-in area of the DVD layer (L0) 15. It is to be noted that a Burst Cutting Area (BCA) can not be formed in a DVD video in which images are dealt with.

<HD DVD>

On the other hand, as has been often reported in recent years, HD DVD has been proposed wherein a blue-violet semiconductor laser (hereinafter, referred to as blue-violet laser) is used to achieve a recording density three times or more as high as that of DVD in order to satisfy a desire to store high definition (HD) images on a single disc. HD DVD has been standardized in the DVD forum (refer to the World Wide Web: dvdforum.org). This has not been commercialized yet.

HD DVD has the same disc structure as that of a conventional DVD. A single-sided single layer HD DVD disc has a capacity of 15 GB and a single-sided dual layer HD DVD disc has a capacity of 30 GB. These large capacities have been realized by new technologies, including a shorter wavelength of laser light, a larger NA, a modulation system, and new signal processing (Partial Response and Maximum Likelihood (PRML)).

Figure 3:
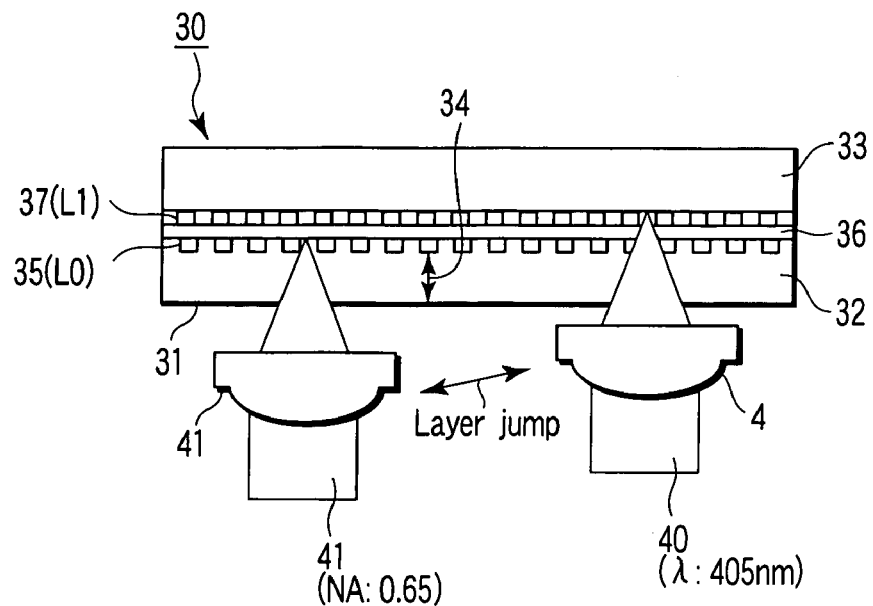
FIG. 3 is an exemplary diagram showing the relationship between the basic structure of a single-sided dual layer HD DVD disc and an optical head.

FIG. 3 shows the relationship between the basic structure of a single-sided dual layer HD DVD disc 30 and an optical head. In the HD DVD, a laser beam to read information from the disc has been changed from a red laser beam (650 nm) to a blue-violet laser beam (405 nm) 40 to have a shorter wavelength, and NA of an objective lens 41 has increased from 0.6 to 0.65, resulting in a different spherical aberration and a different coma aberration caused by a tilt. Therefore, an actual disc is different from the DVD, for example, in terms of the position of a HD DVD layer (L0) 35 and a HD DVD layer (L1) 37 from a light incidence plane 31 and in terms of the thickness of an space layer 36.

Figure 4:
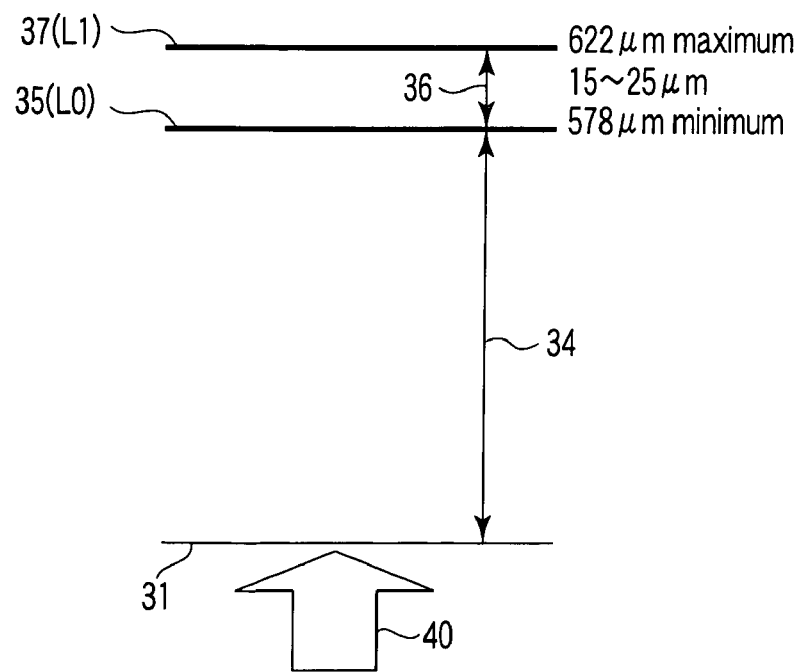
FIG. 4 is an exemplary diagram showing the position of the recording layers of the single-sided dual layer HD DVD disc.

FIG. 4 shows the position of the layers of the single-sided dual layer HD DVD disc when viewed from the light incidence plane 31. Since the spherical aberration has become severer as a result of making the wavelength shorter and NA larger, the HD DVD layer (L0) 35 is limited to a position a minimum of 578 μm away from the light incidence plane and the HD DVD layer (L1) 37 is limited to a position a maximum of 622 μm away from the light incidence plane. The distance between the two layers (or space layer 36) is determined to be 15 to 25 μm.

On the other hand, the reflectivities of the HD DVD layers are determined as follows:

Single-layer disc: 40% to 70% (with birefringence)
Dual layer disc: 18% to 32% (with birefringence)

As in DVD, identification information indicating the reflectivity, layer structure and the like of the disc is in Identification Data (ID) of a data frame and in Physical Format Information (PFI) in a Control Data Zone (CDZ) located in a System Lead-in area of the HD DVD layer (L0) 35. In addition, in the HD DVD, identification information and contents protection information for the disc are provided in a Burst Cutting Area (BCA) formed inside the Lead-in area. This BCA is formed in the HD DVD layer (L1) 37.

<Existing DVD and HD DVD>

Thus, the high-capacity HD DVD capable of storing HD images has been proposed. An HD DVD device (drive or player) newly designed for HD DVD can be designed to be able to read data from not only an HD DVD disc but also a DVD. However, since this HD DVD disc is substantially different from the existing DVD in the recording density, modulation system, signal processing, track format, and the like, a conventional DVD device (drive or player) can not read information recorded thereon. That is, the conventional DVD device has the disadvantage of being unable to read the high-definition movie content recorded on the HD DVD disc but also the conventional DVD movie content. In order to cope with the problem, an HD DVD/DVD Twin format disc having an HD DVD recording layer and a DVD recording layer has recently been standardized in the HD DVD format (refer to the World Wide Web: dvdforum.org).

<HD DVD/DVD Twin Format Disc>

The Twin format disc is a new disc which can be treated as a DVD disc in the conventional DVD device and can be treated as an HD DVD disc in the HD DVD device. Moreover, if a device compatible with both the formats is used, this disc permits information (such as content) in both the formats to be selected by a user and read.

Figure 5:
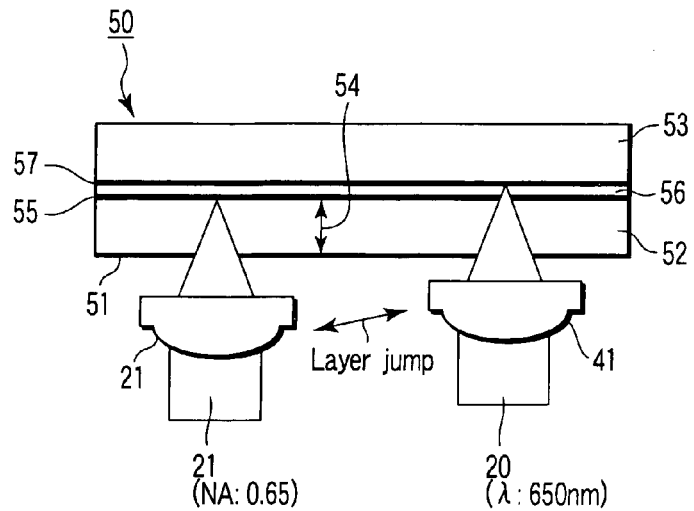
FIG. 5 is an exemplary diagram showing the relationship between the basic structure of an HD DVD/DVD twin format disc and an optical head.

FIG. 5 shows the relationship between the basic structure of an HD DVD/DVD Twin format disc and an optical head. A twin format disc 50 comprises a DVD substrate 52 where a DVD layer is formed, an HD DVD substrate 53 where an HD DVD layer is formed, and an space layer 56. When viewed from a light incidence plane 51, there are formed a DVD layer 55 and an HD DVD layer 57 in this order.

Figure 6:
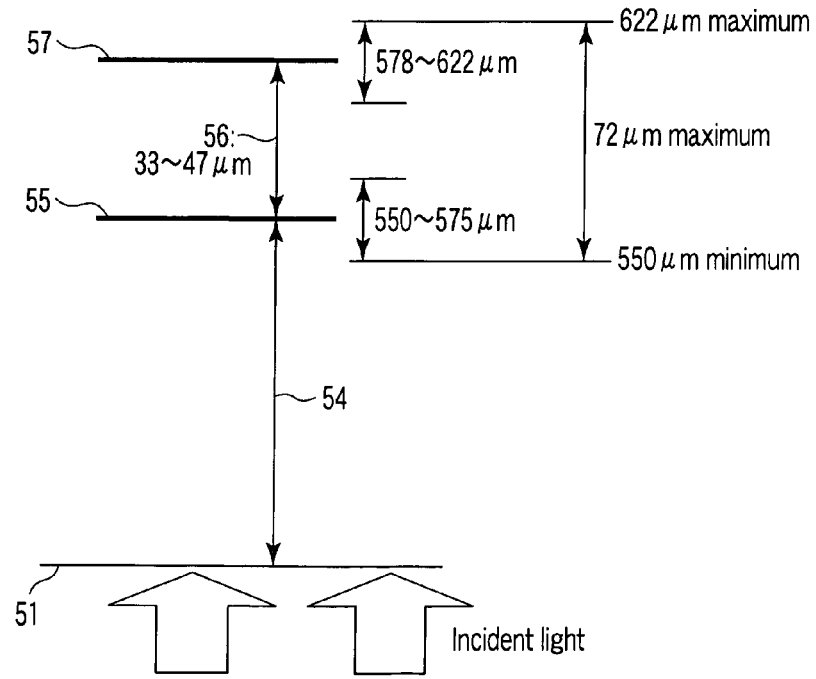
FIG. 6 is an exemplary diagram showing the position of the recording layers in the HD DVD/DVD Twin format disc.

FIG. 6 shows the relationship of the position of the layers in the Twin format disc. From the light incidence plane 51, the DVD layer 55 is positioned 550 to 575 μm, the space layer 56 is positioned 33 to 47 μm, and the HD DVD layer 57 is positioned 578 to 622 μm. It is to be noted that the maximum distance between the DVD layer 55 and the HD DVD layer 57 is 72 μm.

Furthermore, the reflectivity of this disc when read with a red laser beam is determined as follows:

DVD layer: 45% or more
HD DVD layer: below 8%

In the current single-sided single layer DVD disc, there is no definition of a layer crosstalk, but crosstalk from the HD DVD layer is determined so that it can be successfully read by the current DVD devices (if the layer crosstalk is close to 8%, information can not be read by some players).

On the other hand, the reflectivity when reading with a blue-violet laser beam is determined as follows:

HD DVD layer: 14 to 28%

As just described, the Twin format disc has been standardized in HD DVD format, such that the conventional DVD device can also read the DVD information.

Identification information indicating the reflectivity, layer structure and the like of this disc is in the DVD layer 55 and the HD DVD layer 57. Moreover, in the HD DVD layer 57, a BCA is formed inside the lead-in area.

However, since the single layer DVD disc is defined in this Twin format disc, there is a problem that it is not possible to record contents produced for the dual layer DVD discs which constitute the majority of the actual market. Further, while the reflectivity of the HD DVD layer when read with red laser is determined to be below 8%, there is a problem that some players can not read data due to the layer crosstalk from the HD DVD layer if the reflectivity is close to 8%.

Therefore, the present inventors have devised an optical disc, an optical disc apparatus, an optical disc reproducing method, and a digital work publication using the optical disc as a medium which enable a single disc to deal with not only the information (content) in the HD DVD but also the information (content) in the single-sided dual layer DVD. Hereinafter, specific embodiments thereof will be explained.

<Basic Configuration of an Optical Disc>

FIG. 7 shows the relationship between an optical disc according to one embodiment of the present invention and an optical head. In an optical disc 70, there are formed, from a light incidence plane 71 in order, a first signal substrate 72, a first recording layer (DVD layer (L0)) 75, a first space layer 76, a second recording layer (DVD layer (L1)) 77, a second space layer 80 and a third recording layer (HD DVD layer (L2)) 81. Data is read from the DVD layers (L0) 75 and (L1) 77 through an objective lens 21 with a red laser beam 20, and data is read from the HD DVD layer (L2) through an objective lens 41 with a blue-violet laser beam 40.

FIG. 8 is a diagram showing the relation of position of the respective recording layers from the light incidence plane 71. From the light incidence plane 71, the DVD layer (L0) 75 is located a minimum of 550 μm, while the HD DVD layer (L2) 81 is located a maximum of 622 μm. Thus, an allowable distance between the two layers is a maximum of 72 μm. The three recording layers including the DVD layers (L0) and (L1) and the HD DVD layer (L2) can be arranged within 72 μm in such a manner as to satisfy their standards in a range which permits actual manufacture.

In the current DVD standard, the space layer distance of the dual layer DVD disc is a minimum of 40 μm, while the space layer distance of the dual layer HD DVD disc is a minimum of 15 μm. If these distances are subtracted from 72 μm, there remains a room of 17 μm. The accuracy of manufacturing the first signal substrate 72, the first space layer 76 and the second space layer 80 has to be covered within 17 μm.

However, in the current manufacturing technique, the accuracy in the injection molding of the first signal substrate is limited to about ±7 μm given the manufacturing accuracy of a stamper and attachment accuracy. On the other hand, the formation accuracy of an interlayer of 15 to 20 μm is about ±2 μm, and the formation accuracy of an interlayer of 30 to 40 μm is about ±3 μm. These manufacturing tolerances when combined add up to 24 μm, so that there is a shortage of about 7 μm (=17 μm−24 μm) considering the practical manufacture.

This is presently one of the reasons that two DVD layers can not be provided in the HD DVD/DVD Twin format disc.

It has been found that limiting the ratio of the reflectivities of the DVD layers permit the space layer distance to be reduced to some extent without increasing the layer crosstalk, and the present invention has been made under this fact.

FIG. 8 shows one practical example of the positional relation among the recording layers of the present invention. In the present invention, the ratio of difference between reflectivities of the DVD layers (L0) 75 and (L1) 77 is limited to about 10% to reduce the minimum value of the first space layer 76 to about 32 μm. As a result, the first space layer 76 is 32 to 38 μm, and the second space layer 80 is 15 to 19 μm, so that, from the light incidence plane 71, the DVD layer (L0) 75 is located 557.5±7.5 μm from the light incidence plane 71, the DVD layer (L1) 77 is located 592.5±10.5 μm, and the HD DVD layer (L2) 81 is located 609.5±12.5 μm. Thus, three recording layers can be formed in one disc: the single-sided dual layer DVD layers and the HD DVD layer.

<How to Manufacture the Disc of the Present Invention, Manufacturing Process>

Figure 9:
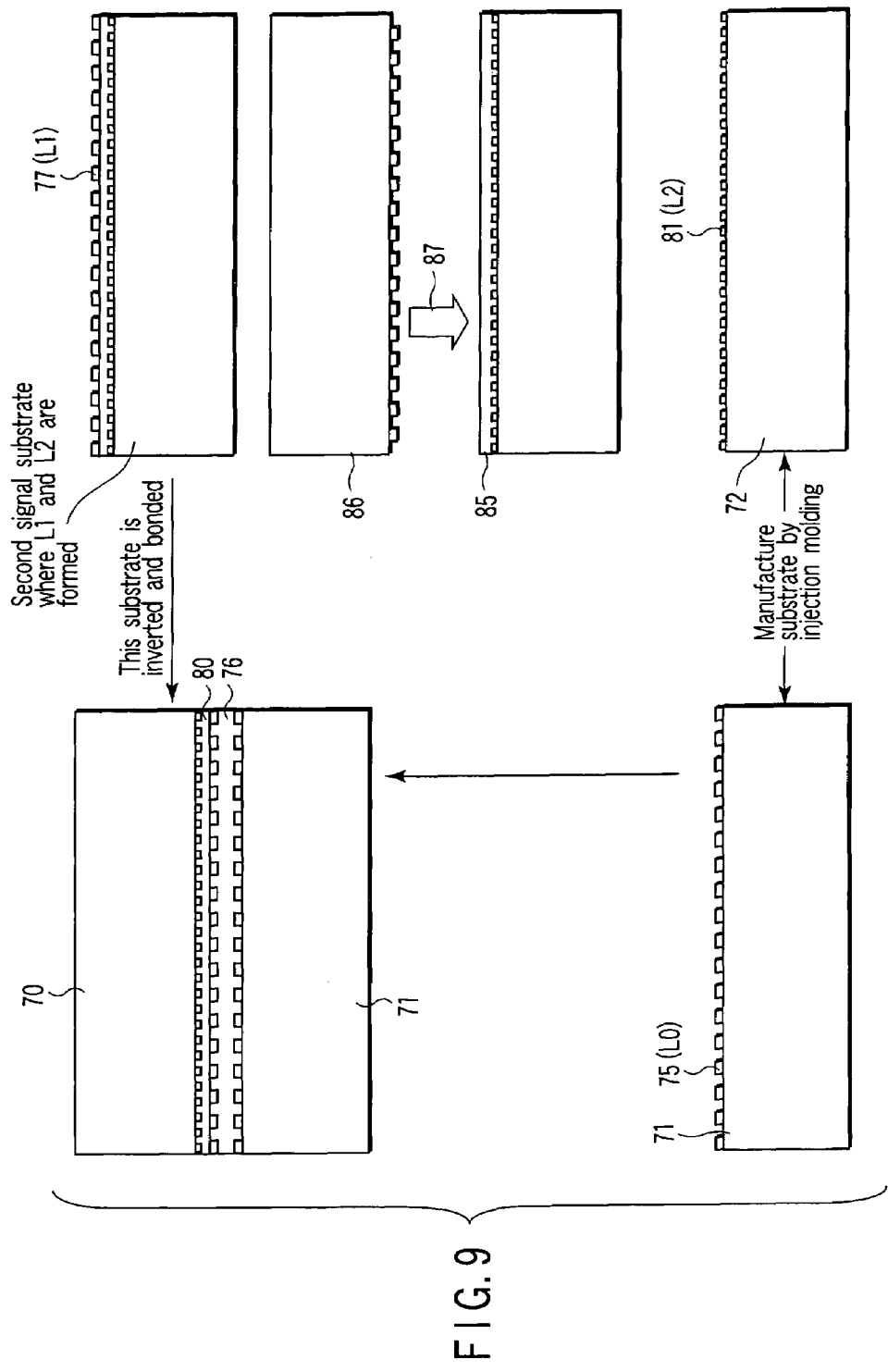
FIG. 9 is an exemplary diagram showing one embodiment of the manufacture of an optical disc.

FIG. 9 shows one specific embodiment of the manufacture of an optical disc of the present invention.

A first signal substrate where pits of a DVD layer (L0) are formed is molded by a first injection molding machine (not shown). The accuracy of the thickness of the substrate is 557.5±7.5 μm. Then, a translucence film is formed by sputtering with a first sputter device (not shown), thereby forming the DVD layer (L0).

A second signal substrate where an HD DVD layer (L2) is formed is molded by a second injection molding machine (not shown). The thickness of the substrate may be about 0.6 mm. A high reflection film is formed by sputtering with a second sputter device (not shown), thereby forming the HD DVD layer (L2).

(3) A transparent film serving as a second space layer is formed by a first spin coater (not shown) on the second signal substrate where the HD DVD layer is formed.

(4) A transparent stamper 86 serving as a mold for a separately manufactured DVD layer (L1) is pressed and then released, thereby forming DVD layer (L1) pits and the second space layer. The thickness of the space layer is 17±2 μm.

(5) A translucent film is formed by sputtering with a third sputter device (not shown) on the pits of the DVD layer (L1), thereby forming the DVD layer (L1). As a result, the DVD layer (L1) 77 and the HD DVD layer (L2) 81 are formed on the second signal substrate.

(6) The first signal substrate 72 manufactured in (1) and the second signal substrate manufactured in (5) are bonded together by a bonding device (not shown) with an accuracy of 35±3 μm.

The above shows one example of the manufacturing of the optical disc of the present invention. Alternatively, an optical disc may be manufactured as follows: a DVD layer (L1) is formed on a first signal substrate where a DVD layer (L0) is formed, and an HD DVD layer (L2) is separately formed on a second signal substrate, and then the two substrates are bonded together.

FIG. 10 shows a process of manufacturing the optical disc of the present invention. A rectangular dotted-line block 95 on the left side of the drawing includes the same manufacturing process as those of the conventional dual layer disc and Twin format disc. On the other hand, a rectangular dotted-line block 99 on the right side of the drawing is a process section which is added for the present invention.

An L0 stamper (for the DVD layer) and an L2 stamper (for the HD DVD layer) are installed on the two injection molding machines (not shown), respectively (steps 88 and 91), and the first signal substrate 71 for L0 and the second signal substrate 72 for L2 are injection-molded (steps 89 and 92). Next, a reflection film is formed by sputtering with two sputter devices (not shown), thereby forming the DVD layer (L0) 75 and the HD DVD layer (L2) (step 81).

In the case of the conventional dual layer discs (DVD, HD DVD) and Twin format disc, the reflectivities of the respective layers are independently defined reflectivities and are different from the reflectivities in the present invention. However, when the two substrates are bonded together by use of the bonding device (not shown) (step 93), the disc is completed.

In contrast, in the present invention, the additional process 99 is used to form the DVD layer (L1) 77 on the HD DVD layer (L2) (step 81) formed on the second signal substrate 72.

First, the second space layer is formed by spin coating using a spin coating device (not shown) (step 96), and a transparent stamper is pressed thereon (step 86) and released after hardening (87: the device is not shown), thereby forming the DVD layer (L1) (step 97).

Then, the reflection film is formed thereon by sputtering (the device is not shown), thereby forming the DVD layer (L1) 77. The second signal substrate where the second and third recording layers are formed is bonded to a first signal substrate 90 spin-coated with the first space layer in such a manner that the recording layers lie between the two substrates (step 93), which completes the disc of the present invention (step 94).

This process is characterized in that the disc can be manufactured by adding the process 99 to the manufacturing process of the Twin format disc. The reason is that the first space layer 76 of the present invention can be formed with simple tuning because the thickness of the first space layer formed in a bonding step is substantially close to that in the case of the Twin format disc. Therefore, the manufacturing process described above is also an effective manufacturing method in reducing the expenditure associated with equipment.

<Layer Crosstalk of DVD and the Space Layer>

The space layer of the DVD is determined to be 40 to 70 μm, while the reflectivity thereof is 18 to 30%. This means that the definition of the reflectivity including the layer crosstalk is achieved even if the space layer distance is a minimum of 40 μm. That is, the deterioration of signals due to the crosstalk does not matter even if the layer crosstalk increases to (30%/18%)≅1.67. This means that if the ratio of difference in reflectivity between the DVD layers (L0) 75 and (L1) 77 is low, the range of the layer crosstalk can be brought to the range of originally designed values even when the space layer distance (the first space layer 76) is reduced correspondingly.

Now, if the reflectivities of the DVD layers (L0) 75 and (L1) 77 are in equal ratio, the space layer distance (the first space layer 76) can be reduced to $$40\ \mu m/\sqrt{(1.667)}=31\ \mu m$$

with the same layer crosstalk.

Practically, the ratio of the reflectivities of the DVD layers (L0) 75 and (L1) 77 can be brought to about 1.06 (difference of reflectivities: 6%), so that the space layer distance (the first space layer 76) is $$40\ \mu m/\sqrt{(1.67/1.075)}=32.1\ \mu m.$$

Even if the space layer distance is reduced to about 32 μm from 40 μm of the DVD standard, the layer crosstalk can be the same (about 32.5 μm when the ratio of the reflectivities is 1.1).

<Reflectivities of the Respective Layers>

In the embodiment of the present invention, a disc configuration will be shown wherein an Ag alloy film is used for the reflection film of the DVD layer and an Al alloy film is used for the reflection film of the HD DVD layer in order to satisfy the conditions described above. Reflection loss in the light incidence plane 71 is 10% in double pass for simplicity concerning the red laser beam and the blue-violet laser beam. Moreover, the birefringence of the disc is 60 nm in the same double pass as the double pass in the HD DVD-ROM standard. The loss is a maximum of 20% for the blue-violet laser beam, and a maximum of 8.2% for the red laser beam. The final result is considered.

FIGS. 11A and 11B show actual measurement values of the reflectivity and transmissivity of the Ag alloy film when its thickness is changed, wherein FIG. 11A concerns the red laser beam (650 nm) and FIG. 11B concerns the blue-violet laser beam (405 nm).

FIGS. 12A and 12B show the reflectivity and transmissivity of the Ag alloy film calculated on the basis of the above actual measurement values, wherein FIG. 12A concerns the red laser beam (650 nm) and FIG. 12B concerns the blue-violet laser beam (405 nm). The calculations below were carried out using the reflectivity and transmissivity in FIGS. 11A and 11B.

Figure 13:
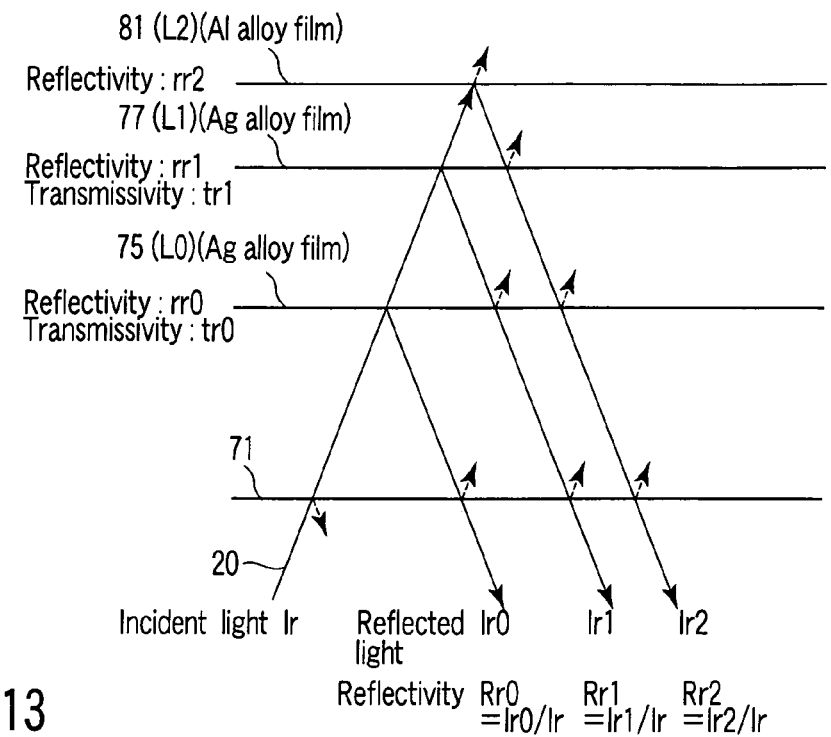
FIG. 13 is an exemplary diagram showing the reflectivities of layers of the optical disc with respect to a red laser beam.

FIG. 13 shows the relationship between light reflected from the respective layers and the reflectivity thereof when the red laser beam (Ir) 20 has entered the optical disc 70 of the present invention. The reflectivities of the respective layers can be calculated by use of the reflectivities and transmissivities of the respective recording films. However, the loss of the incidence plane is 10%, and the effects of the birefringence are considered later and are not included in these equations.

The reflectivity of the DVD layer (L0) 75:

$$Rr0 = Ir0/Ir \cong 0.9 \times rr0 \quad (1)$$

The reflectivity of the DVD layer (L1) 77:

$$Rr1 = Ir1/Ir \cong 0.9 \times (tr0)^2 \times rr1 \quad (2)$$

The reflectivity of the HD DVD layer (L2) 81:

$$Rr2 = Ir2/Ir \cong 0.9 \times (tr0)^2 \times (tr1)^2 \times rr2 \quad (3)$$

Figure 14:
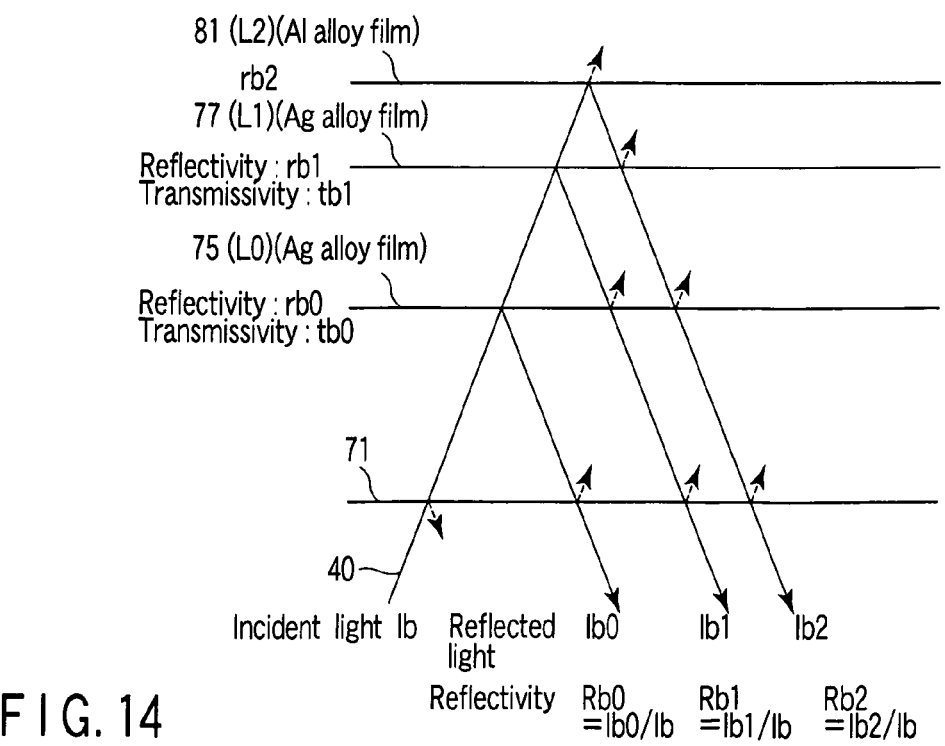
FIG. 14 is an exemplary diagram showing the reflectivities of the layers of the optical disc with respect to a blue-violet laser beam.

In the same manner, FIG. 14 shows the relationship between light reflected from the respective layers and the reflectivity thereof when a blue-violet laser beam (Ib) 40 has entered the optical disc 70 of the present invention. The reflectivities of the respective layers can be calculated by use of the reflectivities and transmissivities of the respective recording layers. However, the loss of the incidence plane is 10%, and the effects of the birefringence are considered later and are not included in these equations.

The reflectivity of the DVD layer (L0) 75:

$$Rb0 = Ib0/Ib \cong 0.9 \times rb0 \quad (4)$$

The reflectivity of the DVD layer (L1) 77:

$$Rb1 = Ib1/Ib \cong 0.9 \times (tb0)^2 \times rb1 \quad (5)$$

The reflectivity of the HD DVD layer (L2) 81:

$$Rb2 = Ib2/Ib \cong 0.9 \times (tb0)^2 \times (tb1)^2 \times rb2 \quad (6)$$

The optical disc of the present invention needs to satisfy the definition of the reflectivity of the existing dual layer DVD disc when it is played back with the red laser beam.

In FIG. 15, (a): the data in FIG. 12 is used to equalize the reflectivity (Rr0) of the L0 layer with the reflectivity (Rr1) of the L1 layer. (b): The thickness of the Ag alloy film formed in the L0 layer is changed in such a range as to satisfy the definition of the reflectivity of the dual layer DVD disc. In this case, (c): the reflectivities (Rr0, Rr1, Rr2) of the respective layers with respect to the red laser beam and (d): the reflectivities (Rb0, Rb1, Rb2) of the respective layers with respect to the blue-violet laser beam are calculated, (e): which are shown in a graph in FIG. 15. However, there is no birefringence, and the thickness of the HD DVD layer (L2) is fixed to 40 nm.

The reflectivities of the respective layers when the red laser beam (Ir) 20 has entered the optical disc 70 of the present invention are indicated below:

The reflectivity of the DVD layer (L0) 75→Rr0 (=Rr1)
The reflectivity of the DVD layer (L1) 77→Rr1 (=Rr0)
The reflectivity of the HD DVD layer (L2) 81→Rr2

The reflectivities of the respective layers when the blue-violet laser beam (Ib) 40 has entered the optical disc 70 of the present invention are indicated below:

The reflectivity of the DVD layer (L0) 75→Rb0
The reflectivity of the DVD layer (L1) 77→Rb1
The reflectivity of the HD DVD layer (L2) 81→Rb2

As can be understood from FIG. 15, as the thickness of the Ag alloy film of the L0 layer increases from 8 nm to 10 nm, the reflectivities (Rr0 and Rr1) of the L0 layer and L1 layer when the disc is played back with the red laser beam increase, while the reflectivity Rb2 of the L2 layer when the disc is played back with the blue-violet laser beam decreases. Concerning the L2 layer, if the birefringence is at a maximum value of the standard of 60 nm, the reflectivity decreases by 8.2% for the red laser beam, while the reflectivity decreases by 20% for the blue-violet laser beam. Even if there is birefringence, Rr0 and Rr1 satisfy the standard when the thickness of the Ag alloy film of the L0 layer ranges from 8 to 10 nm, but the reflectivity is 14% or less in Rb2 when the thickness is 9.5 nm.

On the other hand, the reflectivity Rr2 of the HD DVD layer with respect to the red laser beam which functions as the layer crosstalk of the dual layer DVD disc exceeds 10% when the Ag alloy film of the L0 layer is 8 nm, which is a large problem in playing back the DVD layer.

It is to be noted that a decrease of reflectivity due to the incidence plane 71 of the optical disc is set at 10%, but the reflectivity can be increased to little less than 10% at the maximum if anti-reflection coating or the like is employed.

<Layer Crosstalk and Reflectivity>

The reflectivities of the L0 layer and the L1 layer need to satisfy the reflectivity of the dual layer DVD when the optical disc of the present invention is played back with the red laser beam. Further, the reflectivity of the HD DVD layer is below 8% in the Twin disc, but some players may not be able to successfully play back the disc due to the layer crosstalk. However, it has been confirmed that most of the players can read the disc when the reflectivity of the HD DVD layer is 6% (6.4% in actual measurement) and that all the players examined can read the disc when the reflectivity is 5% (5.3% in actual measurement).

Thus, a calculation was made in the case where the reflectivity Rr2 of the L2 film was 6% or less when the thickness of the HD DVD layer (L2) formed of the Al alloy film was reduced and the disc was played back with the red laser beam.

Figure 16:
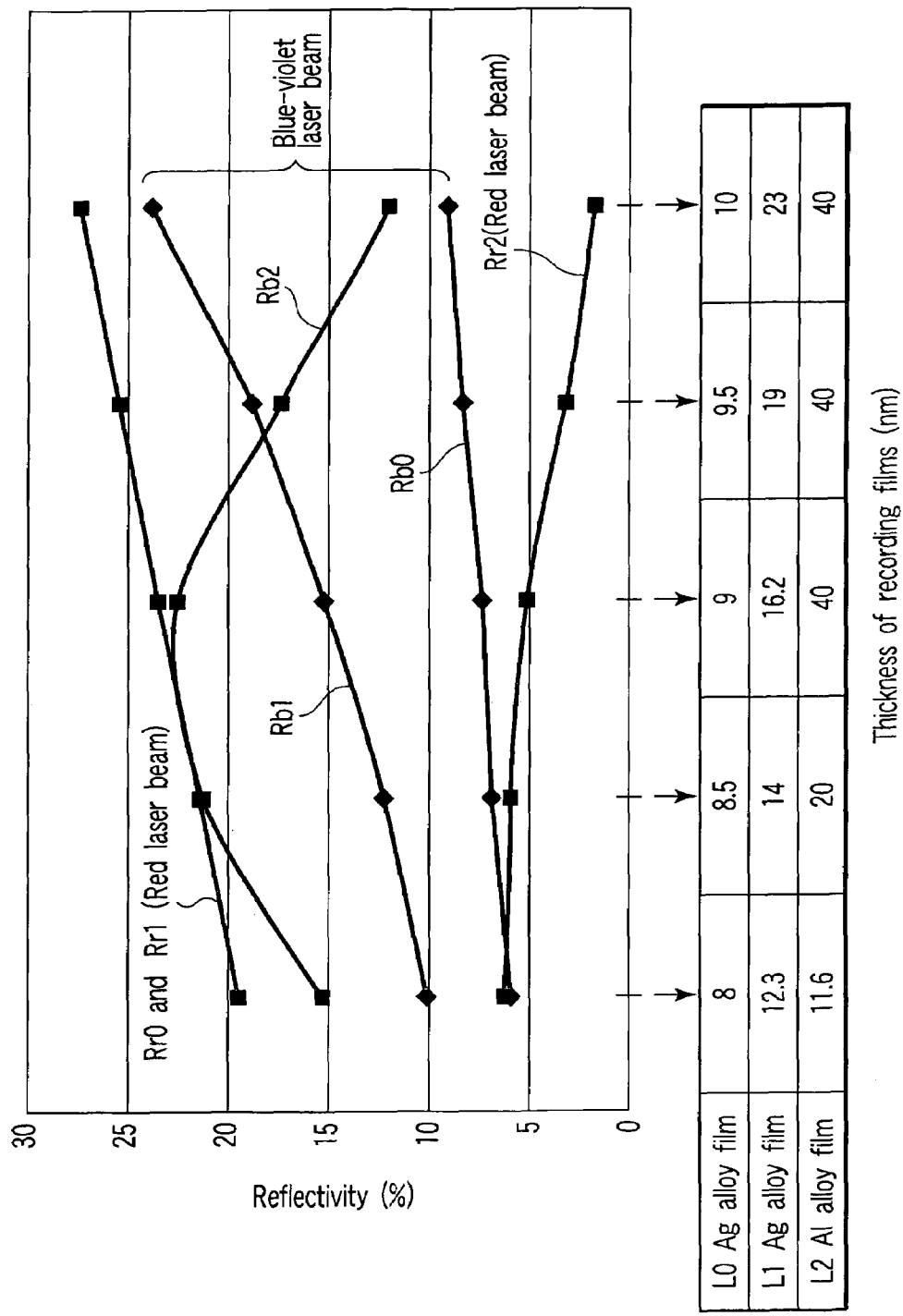
FIG. 16 is an exemplary diagram showing the reflectivities (without birefringence) of the layers when the reflectivity of Rr2 is 6% or less.

FIG. 16 is a diagram showing the reflectivities of the respective layers at that time, wherein when the HD DVD layer (L2) is played back with the blue-violet laser beam, the graph shows a peak at a place where the thickness of the Ag alloy film of the L0 layer is little less than 9 nm, and the reflectivity Rr2 is a little more than 23%.

Figure 17:
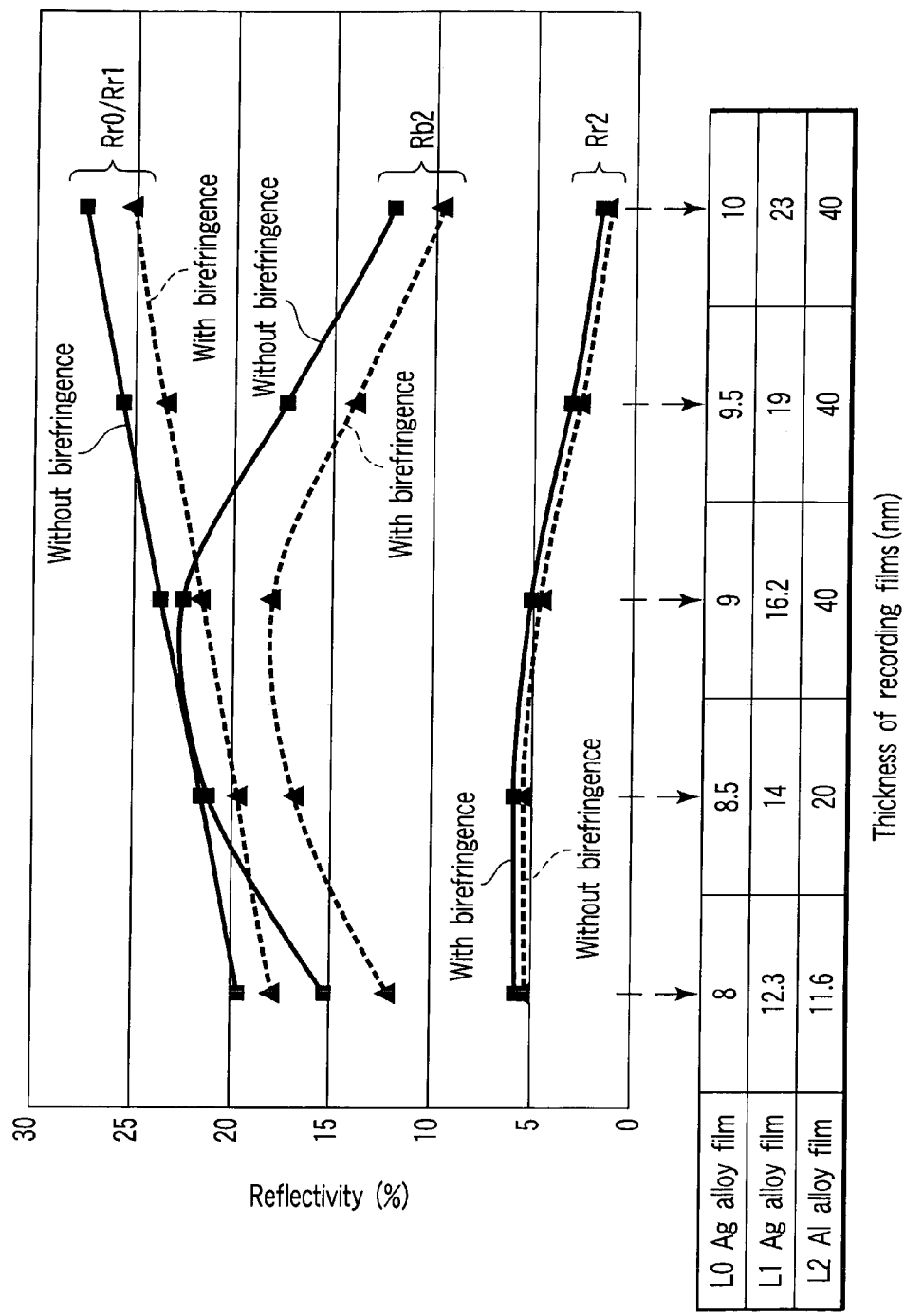
FIG. 17 is an exemplary diagram showing the reflectivities (6% or less in Rr2, Rb0 and Rb1 excluded) of the layers dependent on whether or not there is the birefringence.

FIG. 17 is a diagram showing the reflectivities of the layers other than Rb1 and Rb2 when there is no birefringence and when the birefringence is at a maximum value of the standard of 60 nm (dotted lines).

In the case where there is no birefringence, Rr0 and Rr1 are 18% or more, and Rb2 is 14% or more when the thickness of the Ag alloy film of the L0 layer is about 7.9 to 9.8 nm. In the case where the birefringence is at a maximum value of 60 nm, Rr0 and Rr1 are 18% or more, and Rb2 is 14% or more when the thickness is about 8.2 to 9.5 nm. At this point, Rr0 and Rr1 are little less than 18 to 27%.

Next, a calculation was made in the case where the reflectivity of the L2 layer was 5.3% or less when the disc was played back with the red laser beam.

Figure 18:
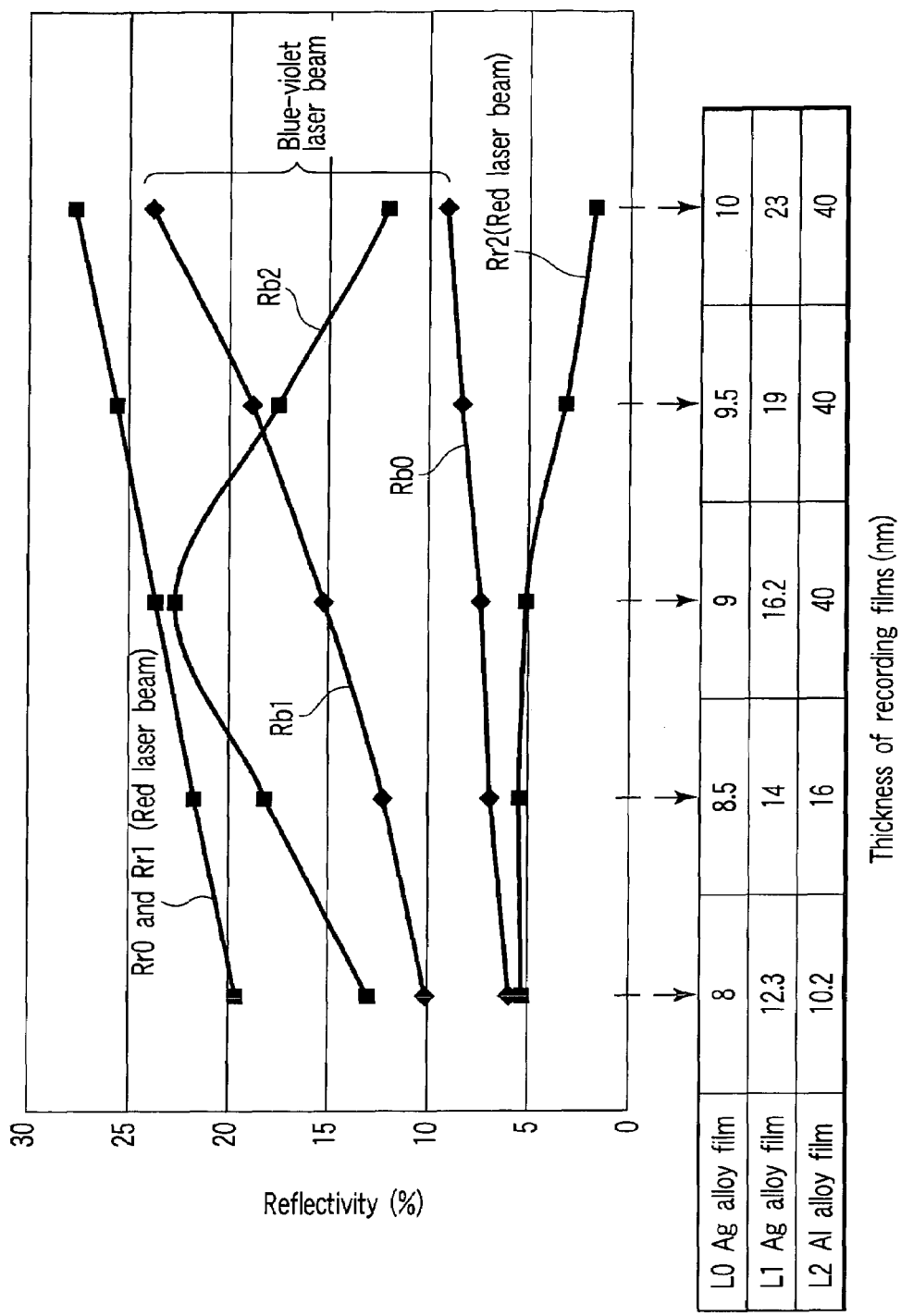
FIG. 18 is an exemplary diagram showing the reflectivities (without birefringence) of the layers when the reflectivity of Rr2 is 5.3% or less.

FIG. 18 is a diagram showing the reflectivities of the respective layers at that time. At this point, when the HD DVD layer (L2) is played back with the blue-violet laser beam, the graph shows a peak in the vicinity of a place where the thickness of the AG alloy film of the L0 layer is 9 nm as in the case where the reflectivity of 6%, and the reflectivity Rr2 is about 23%.

Figure 19:
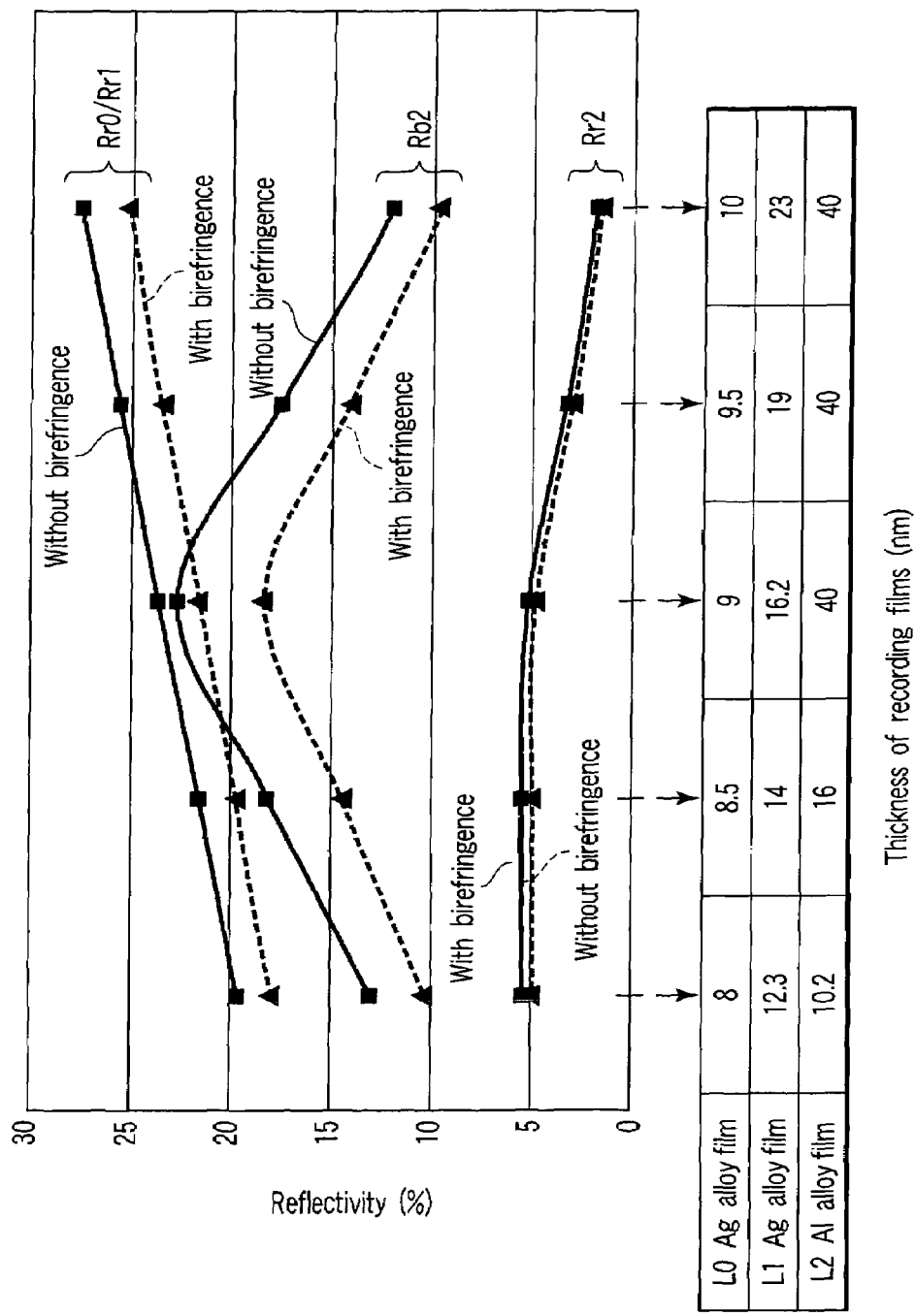
FIG. 19 is an exemplary diagram showing the reflectivities (5.3% or less in Rr2, Rb0 and Rb1 excluded) of the layers dependent on whether or not there is the birefringence.

FIG. 19 is a diagram showing the reflectivities of the layers other than Rb1 and Rb2 when there is no birefringence and when the birefringence is at a maximum value of the standard of 60 nm (dotted lines).

In the case where there is no birefringence, Rr0 and Rr1 are 18R % or more, and Rb2 is 14% or more when the thickness of the Ag alloy film of the L0 layer is about 8.1 to 9.8 nm. In the case where the birefringence is at a maximum value of 60 nm, Rr0 and Rr1 are 18% or more, and Rb2 is 14% or more when the thickness is about 8.5 to 9.5 nm. At this point, Rr0 and Rr1 are little less than 18 to 27%.

As indicated above, if the thickness of the Ag alloy film of the L0 layer is set at about 9±0.5 nm, the reflectivity of the dual layer DVD disc when played back with the red laser beam can be 18 to 30% of the standard, the crosstalk from the HD DVD layer can be 6% or less (5.3% or less), and the reflectivity of the HD DVD layer when played back with the blue-violet laser beam can be 14 to 28% or less.

It is to be noted that if the thickness of the Ag alloy film of the L0 layer is set at about 9±0.5 nm, the reflectivity Rb1 of the DVD layer (L1) when the HD DVD layer (L2) is played back with the blue-violet laser beam is equal to or less than Rb2 as seen from FIG. 15, so that the crosstalk from the DVD layer (L1) does not matter.

Next, the ratio of the reflectivities of Rr0 and Rr1 when there are changes in the thickness of the L0 layer and the L1 layer is examined. Now, a case will be considered where there are changes in thickness: 9±0.2 nm in (L0) and 16.2±0.2 nm in (L1).

The reflectivity and transmissivity of the DVD layer (L0) 75
    8.8 nm: rr0=25.25% tr0=70.22%
    9.2 nm: rr0=26.96% tr0=68.38%
The reflectivity and transmissivity of the DVD layer (L1) 77
    16 nm: rr1=53.8% tr1=40.8%
    16.4 nm: rr1=55.08% tr1=39.52% where Rr0 and Rr1 are:
    Rr0=22.72 to 24.26%
    Rr1=22.64 to 24.44%

From the above calculation, the ratio of the reflectivities is 1.075 in the worst case, and satisfies 1.1 or less. Thus, it is apparent that even with a change in the film thickness, the ratio of the reflectivities between the two layers is 1.1 or less even if the distance (the first space layer 76) between the DVD layers is reduced from 40 μm to about 32 μm, and the layer crosstalk does not matter.

<Flag Information>

Next, a set of flags in the optical disc of the present invention will be explained. The optical disc of the present invention has two DVD layers, so that in the ID composed of four bytes of the data frame of the DVD layers (L0) 75 and (L1) 77, bit positions b29 and b24 are written as
    b29 (reflectivity): 1b (reflectivity is 40% or less)
    b24 (layer number): 0b (in the case of the recording layer (L0))
    1b (in the case of the recording layer (L1)).
    b6b5 of (BP2) of the PFI in the Control Data Zone (CDZ) in the Lead-in area formed in the DVD layer (L0) 75 indicates the number of layers in the disc, so that
    b6b5 (number of layers): 01b (two layers) is written.
Moreover, (BP16) indicates the presence of the BCA, and there must not be BCA in a DVD video, so that
    b7 (BCA flag): 0b (without BCA) is written.
On the other hand, since the HD DVD layer (L2) 81 needs to be treated as a single layer HD DVD with low reflectivity, ID composed of four bytes of the data frame is written as b29 (reflectivity): 1b (reflectivity is 40% or less)
    b24 (layer number): 0b (recording layer (L0))
    b6b5 of (BP2) of the PFI in the Control Data Zone (CDZ) in the Lead-in area formed in the HD DVD layer (L2) 81 indicates the number of layers in the disc:
    b6b5 (Number of layers): 00b (one layer) is written.
    (BP16) indicates the presence of the BCA, so that
    b7 (BCA flag): 1b (with BCA) is written.

Furthermore, in the HD DVD/DVD Twin format disc, there are definitions of the Twin format disc for the conventional single layer DVD and single layer HD DVD, so that (BP33) includes
    Layer 0 (b5-b3): 100b (DVD-ROM format)
    Layer 1 (b2-b0): 000b (HD DVD-ROM format).

Note that since the disc of the present invention has a triple-layer structure, this definition for the dual layer structure is not applied. However, it can be judged that there are two DVD layers if the DVD layers are accessed, and it is therefore possible to use the definition as it is.

However, it is truly more convenient if it can be recognized that there are two DVD layers when the HD DVD layer is accessed. In this case, for example, 101b (dual layer DVD-ROM format) has only to be newly defined in layer 0 (b5-b3).

Next, flag information of the BCA will be explained. A BCA record of the HD DVD has 8 bytes, and (BP4) indicates a book type and a disc type. Since Twin format flag indicating the Twin format disc is in b2 therein, B2
    (Twin format flag): 1b (Twin format disc) is written.

<Reproduction by an Optical Disc Apparatus Complying with the DVD Standard>

Figure 20:
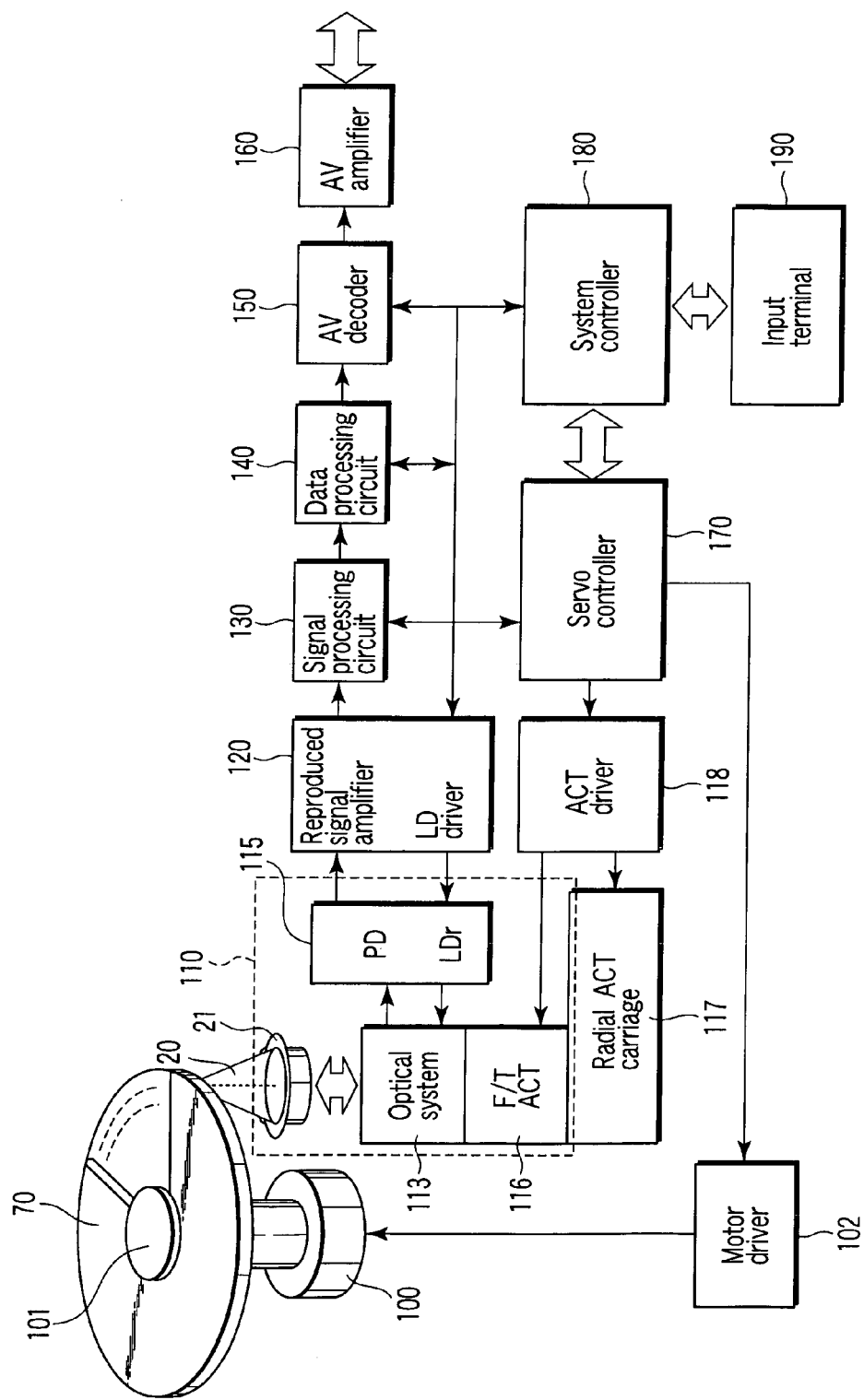
FIG. 20 is an exemplary diagram showing the configuration of a player complying with the DVD standard.
Figure 21:
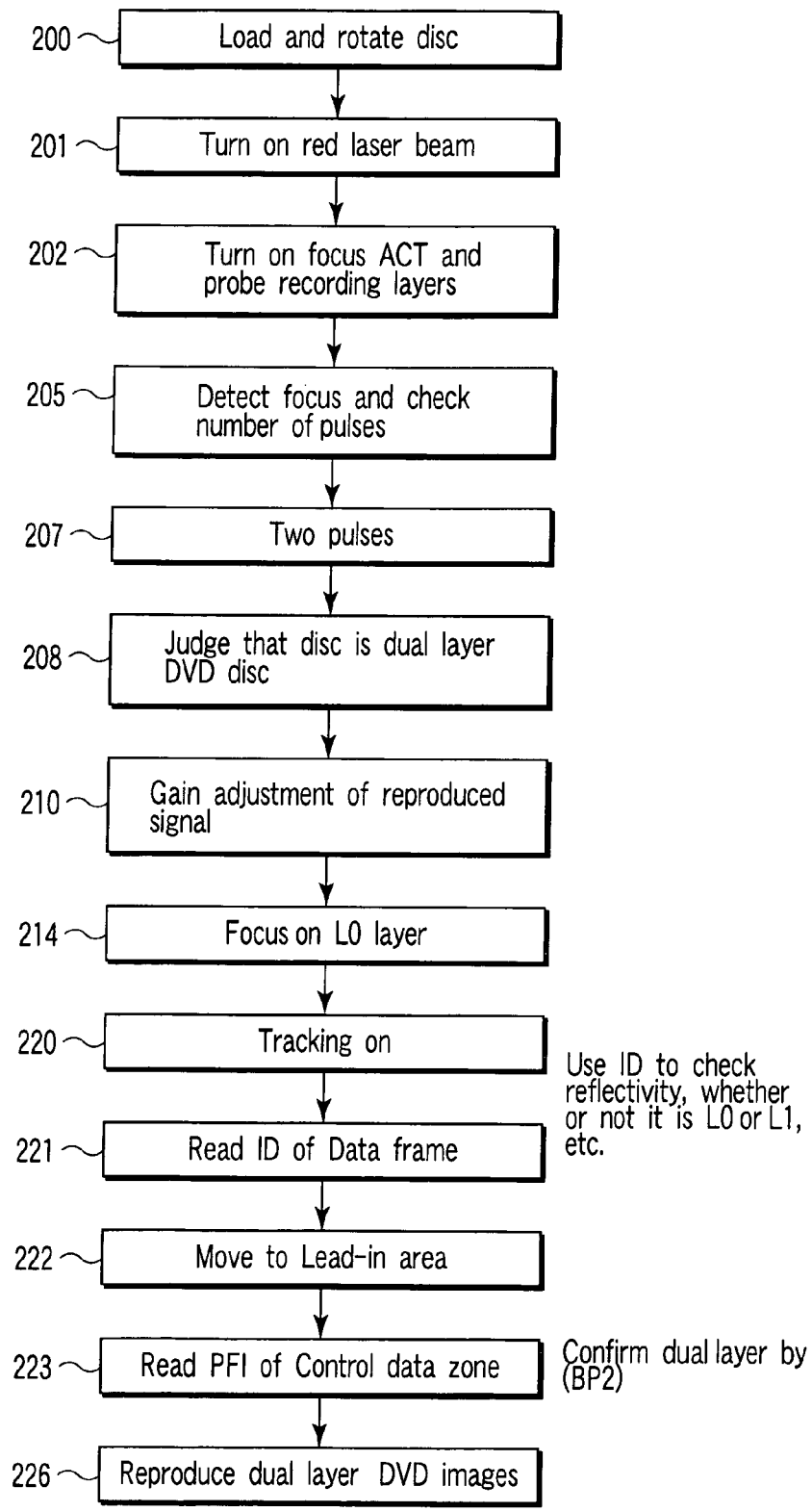
FIG. 21 is an exemplary diagram showing an operation flow when the optical disc of the present invention is played back with a red laser beam on the player complying with the DVD standard.
Figure 22:
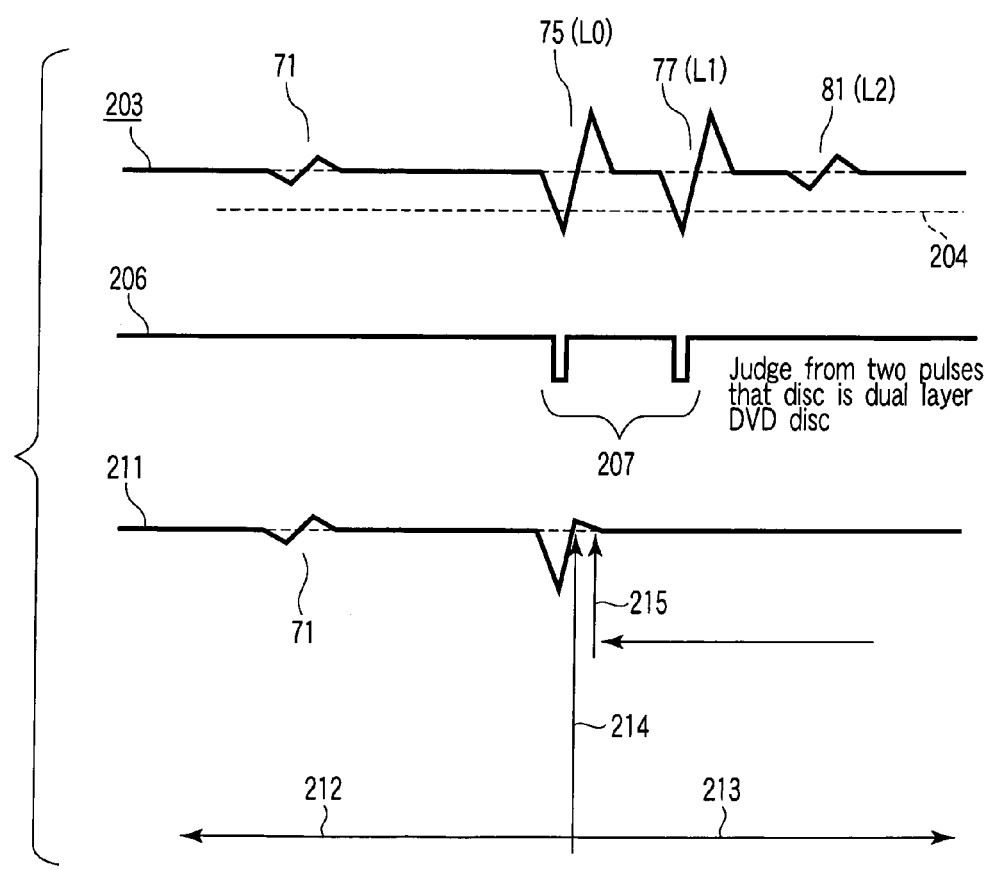
FIG. 22 is an exemplary diagram showing the relationship between focus signals and a focus servo when the optical disc of the present invention is played back with a red laser beam on the player complying with the DVD standard.

Next, a case where the optical disc of the present invention is played back on a conventional DVD player will be explained using FIGS. 20, 21 and 22. FIG. 20 shows the main configuration of a well-known conventional DVD player. FIG. 21 is a flowchart to help explain the operation of the DVD player. FIG. 22 shows focus signals and a focus servo.

In FIG. 20, a spindle motor 100 rotates/drives a turntable. A clamper 101 holds the optical disc 70 onto the turntable. The spindle motor 100 is controlled by a motor driver 102. An optical head 110 includes the objective lens 21 and an optical system 113. The optical system 113 is driven by a focus and tracking actuator 116. When the focus and tracking actuator 116 is controlled by an actuator driver 118, the laser beam is focused on a track on the optical disc and follows the track. A radical actuator 117 is used to move the optical head 110 in the direction of radius of the disc and is controlled by the actuator driver 118.

The reflected light from the disc is taken out of the optical system 113 and is converted into an electric signal at a photodetector in a conversion unit 115. The electric signal is gain-adjusted at a reproduced signal amplifier in a gain adjusting unit 120 and the resulting signal is input to a signal processing circuit 130. The signal processing circuit 130 performs a demodulating process, buffering, error correction, and others and inputs the resulting signal to a data processing circuit 140. Here, the data processing circuit 140 performs packet separation, control signal separation, and the like and inputs video and audio information to an AV decoder 150. The video signal, audio signal, sub-video signal, and the like demodulated at the AV decoder 150 are output as a baseband signal via an AV amplifier 160, and input to a monitor.

Using a focus error signal and tracking error signal obtained by, for example, numerically processing the reproduced signal from a 4-quafrant photodiode, a servo-controller 170 supplies a control signal to the actuator driver 118. In response to a signal from an input terminal (e.g., a remote controller or an operation key input section) 190, a system controller 180 controls the playback, stop, and temporary stop of the apparatus, and the like. In addition, the system controller 180 controls a laser diode driver in the gain adjusting unit 120. The laser diode driver drives the laser diode installed in the optical head 110, thereby outputting a laser beam.

When the optical disc 70 of the present invention is inserted in the DVD player, the spindle motor 100 is rotated until a specific number of revolutions has been reached (in step 200 in FIG. 21). Next, the red laser beam 20 is turned on, and a periodic driving current is caused to flow through the focus actuator (ACT) 116, thereby moving the optical head up and down in the direction of axis (in steps 201 and 202 in FIG. 21). A focus signal 203 produced from the reproduced signal periodically appears (see FIG. 22). The lowest reflectivity of the dual layer DVD is 18%, so that if an FS detection level 204 is set at about 9%, two detection pulses 207 are obtained in a focus detection signal 206 (in steps 205 and 207 in FIG. 21).

From the fact that the two pulses have been detected, this disc is judged to be a dual layer DVD (an actual judgment is made by the Physical Format Information (PFI) described later, thereby entering a sequence to play back the dual layer DVD (in step 208 in FIG. 21).

It is to be noted that the FS detection level 204 is set at about 7% lower than 9% in some DVD players. Even in that case, the optical disc of the present invention is not erroneously detected as a triple layer disc because the reflectivity of the HD DVD layer is 5.3% or less.

After a gain adjustment 210 of the reproduced signal is first made (in step 210 in FIG. 21), the DVD layer (L0) 75 is focused on (in step 214 in FIG. 21). After a short stabilization time has elapsed, the recording layer (L0) 75 is in focused-on state (in step 204 in FIG. 21).

Then, when a suitable position of the disc is tracked on (in step 220 in FIG. 21), the reproduced signal can be read. The optical head 110 is located at a given position of the disc, and reads the ID of the data frame of the reproduced signal, thereby making it possible to judge whether the recording layer is the recording layer (L0) or (L1) and whether the position is in a data area or in the Lead-in area, and also to know the set reflectivity (in step 221 in FIG. 21).

Next, the radical actuator 117 is driven, and the optical head is moved to the Lead-in area (in step 222 in FIG. 21), and then the PFI in the Control Data Zone (CDZ) is read (in step 223 in FIG. 21). Here, (BP2) is checked to verify that the disc is a dual layer DVD disc, which is followed by the reproduction of dual layer DVD images (in step 226 in FIG. 21). The user can enjoy the DVD images using the input terminal 190.

<Reproduction by an Optical Disc Apparatus Complying with the HD DVD Standard>

Figure 23:
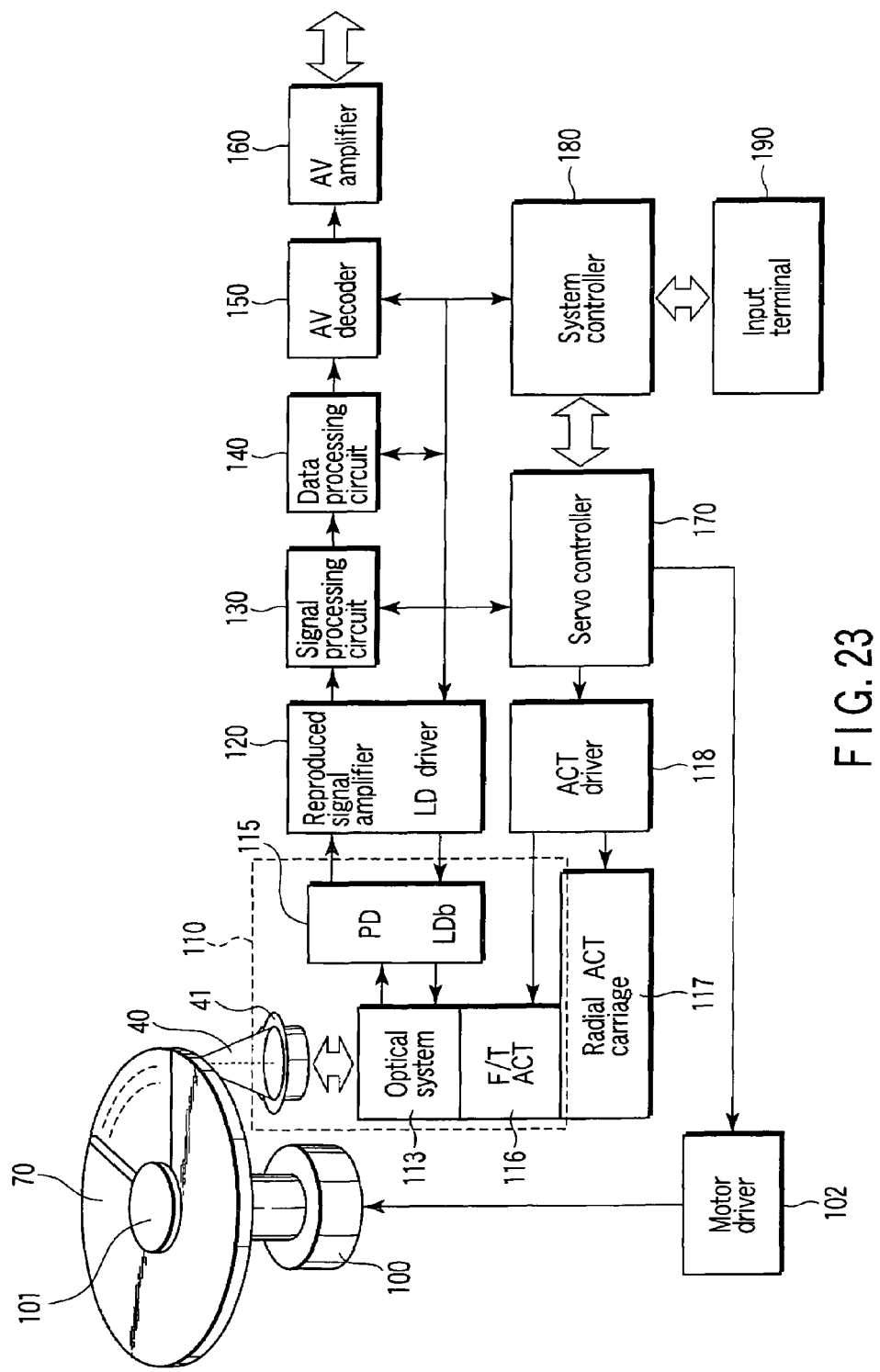
FIG. 23 is an exemplary diagram showing the configuration of an HD DVD player complying with the optical disc.
Figure 24:
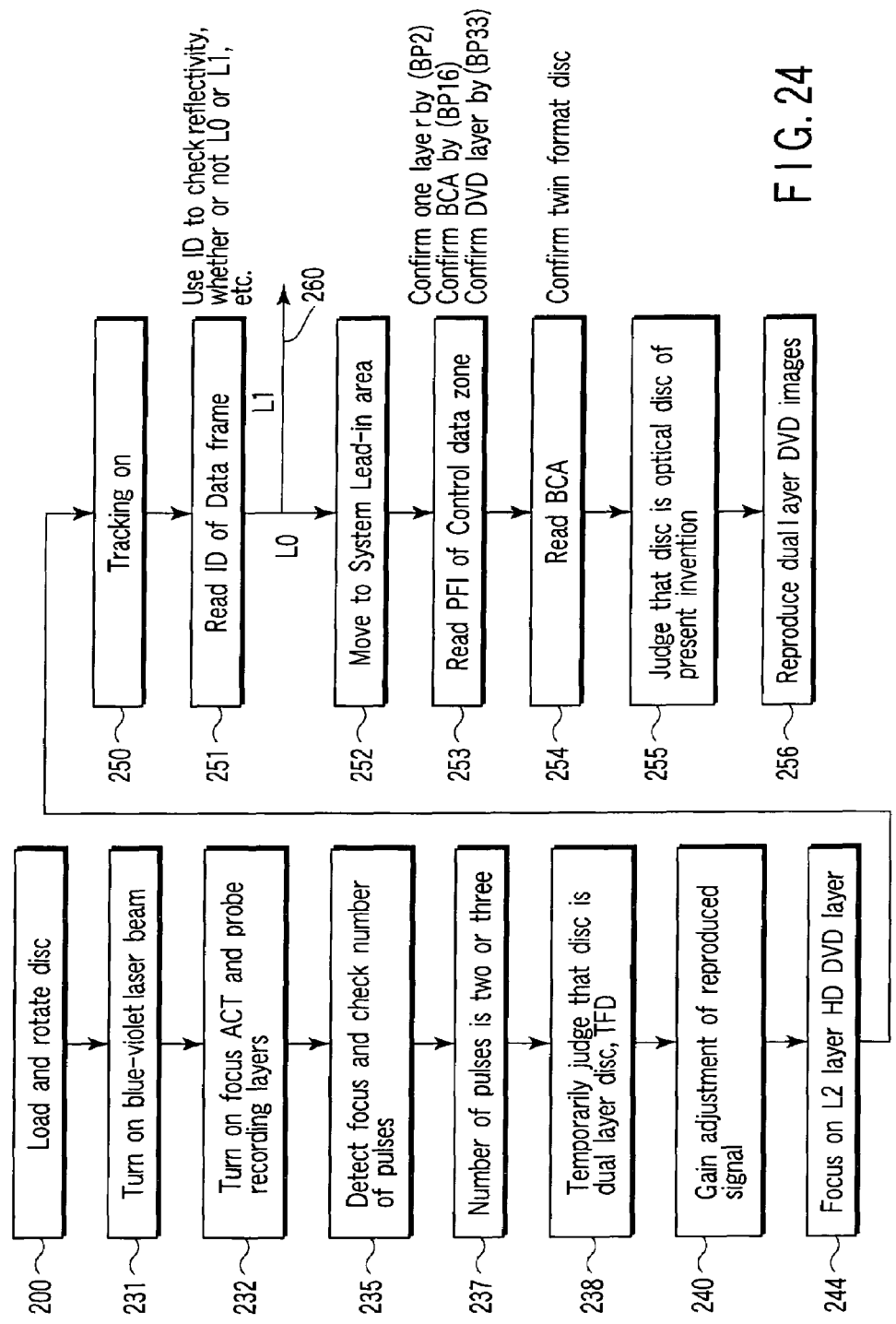
FIG. 24 is an exemplary diagram showing an operation flow when the optical disc of the present invention is played back on the HD DVD player complying with the optical disc.
Figure 25:
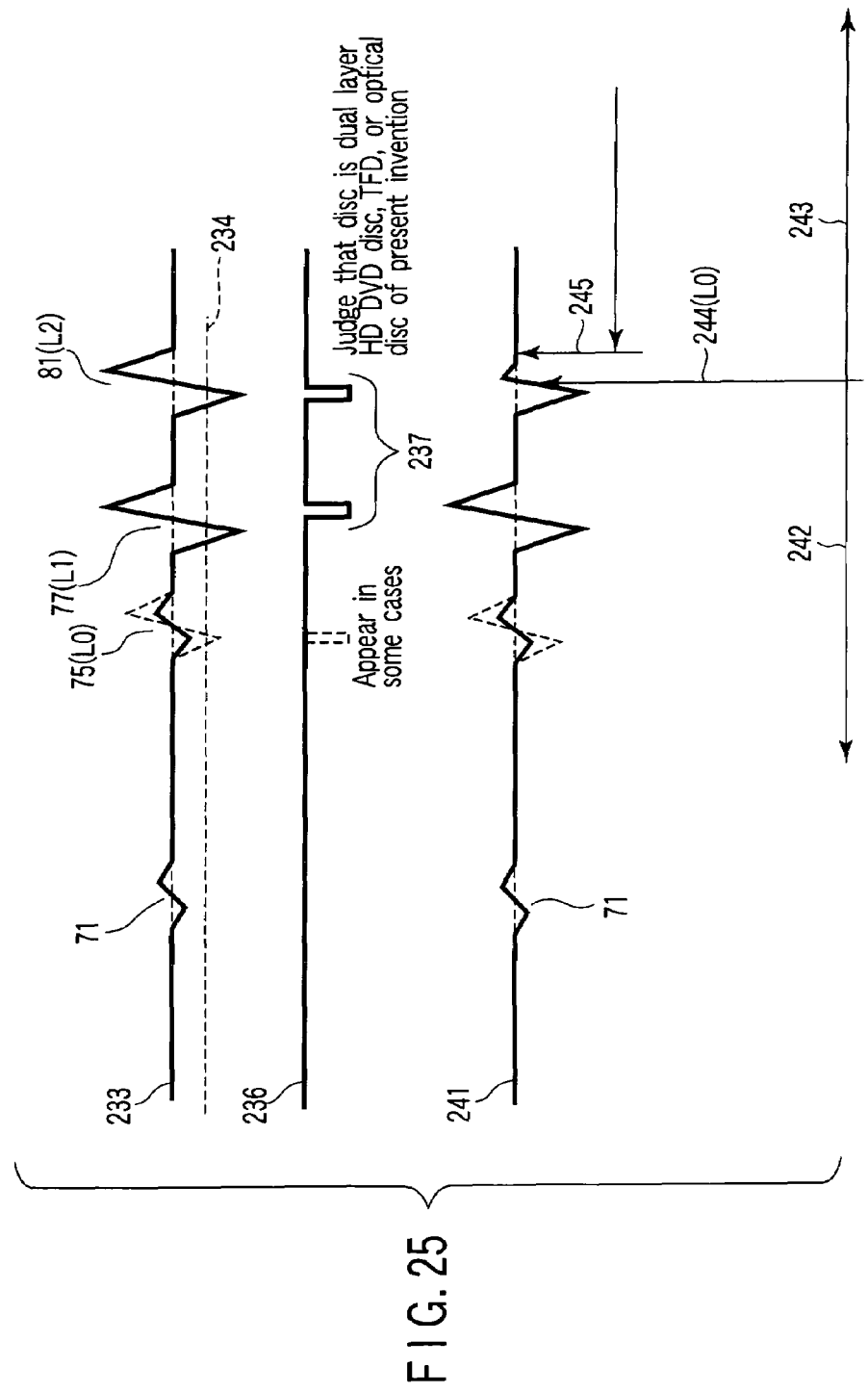
FIG. 25 is an exemplary diagram showing the relationship between focus signals and a focus servo when the optical disc of the present invention is played back with a blue-violet laser beam on the HD DVD player complying with the optical disc.

Next, a case of an HD DVD player using the blue-violet laser beam will be explained using FIGS. 23, 24 and 25. FIG. 23 shows the main configuration of the HD DVD player. FIG. 24 is a flowchart to help explain the operation of the HD DVD player. FIG. 25 shows focus signals and a focus servo. The configuration of the HD DVD player is similar to that of the apparatus shown in FIG. 13, and the same numerals are therefore given to similar parts.

When the optical disc 70 of the present invention is loaded in the HD DVD player, a spindle motor 100 is rotated until a specific number of revolutions has been reached (in step 200 in FIG. 24). Next, the blue-violet laser beam 40 is turned on (in step 231 in FIG. 24), and a periodic driving current is caused to flow through a Focus Actuator (ACT) 116, thereby moving an optical head up and down in the direction of axis (in step 232 in FIG. 24). A focus signal 233 produced from a reproduced signal periodically appears (see FIG. 25).

The lowest reflectivity of the dual layer HD DVD disc is 18% which is similar to that of the dual layer DVD disc, so that if an FS detection level 234 is set at about 9%, two detection pulses 237 are obtained in a focus detection signal 236 (a lower level may be set to adapt to the Twin format disc (TFD)). Moreover, three pulses can sometimes be obtained (in steps 235 and 237 in FIG. 24). Therefore, this disc is temporarily judged to be a dual layer HD DVD disc, a Twin format disc (TFD) or an optical disc of the present invention (in step 238 in FIG. 24), thereby entering a sequence to play back the disc of the present invention (a final judgment is made in accordance with the PFI and the flag information of BCA).

After a gain adjustment of the reproduced signal is first made (in step 240 in FIG. 24), the HD DVD layer (L2) 81 is focused on (in step 244 in FIG. 24). After a short stabilization time has elapsed, the layer (L2) 81 is in focused-on state (in step 245 in FIG. 24). Then, when a suitable position of the disc is tracked on (in step 250 in FIG. 24), the reproduced signal can be read. The optical head 110 is located at a given position of the disc, and reads the ID of the data frame of the reproduced signal, thereby making it possible to judge whether the layer is the (L0) 35 or (L1) 37 of the dual layer HD DVD or a single layer (SL) and whether the position is in the data area or in the lead-in area, and also to know the set reflectivity (in step 251 in FIG. 24).

If, here, the layer is identified as the (L1) layer instead of the (L0) layer or SL, this disc is a dual layer HD DVD disc, thereby moving to a flow 260 (not shown here) of the dual layer HD DVD disc.

When the disc is judged to be the (L0) layer or SL, the radial actuator 117 is driven, and the optical head is moved to the system lead-in area (in step 252 in FIG. 24), and then the PFI in the control data zone (CDZ) is read (in step 253 in FIG. 24). Here, it can be recognized from (BP2) that the disc is an HD DVD single layer disc, from (BP16) that the disc has a BCA, and from (BP33) that a DVD layer is formed in this disc. Subsequently, when the BCA is read (in step 254 in FIG. 24), it is finally verified from the (BP4) of BCA record ID that the disc is an optical disc of the present invention (in step 255 in FIG. 24), which is followed by the reproduction of HD DVD images (in step 256 in FIG. 24). The user can enjoy the HD DVD images using an input terminal 190.

<Reproduction by an Optical Disc Apparatus Complying with Both the HD DVD Standard and the DVD Standard>

Figure 27:
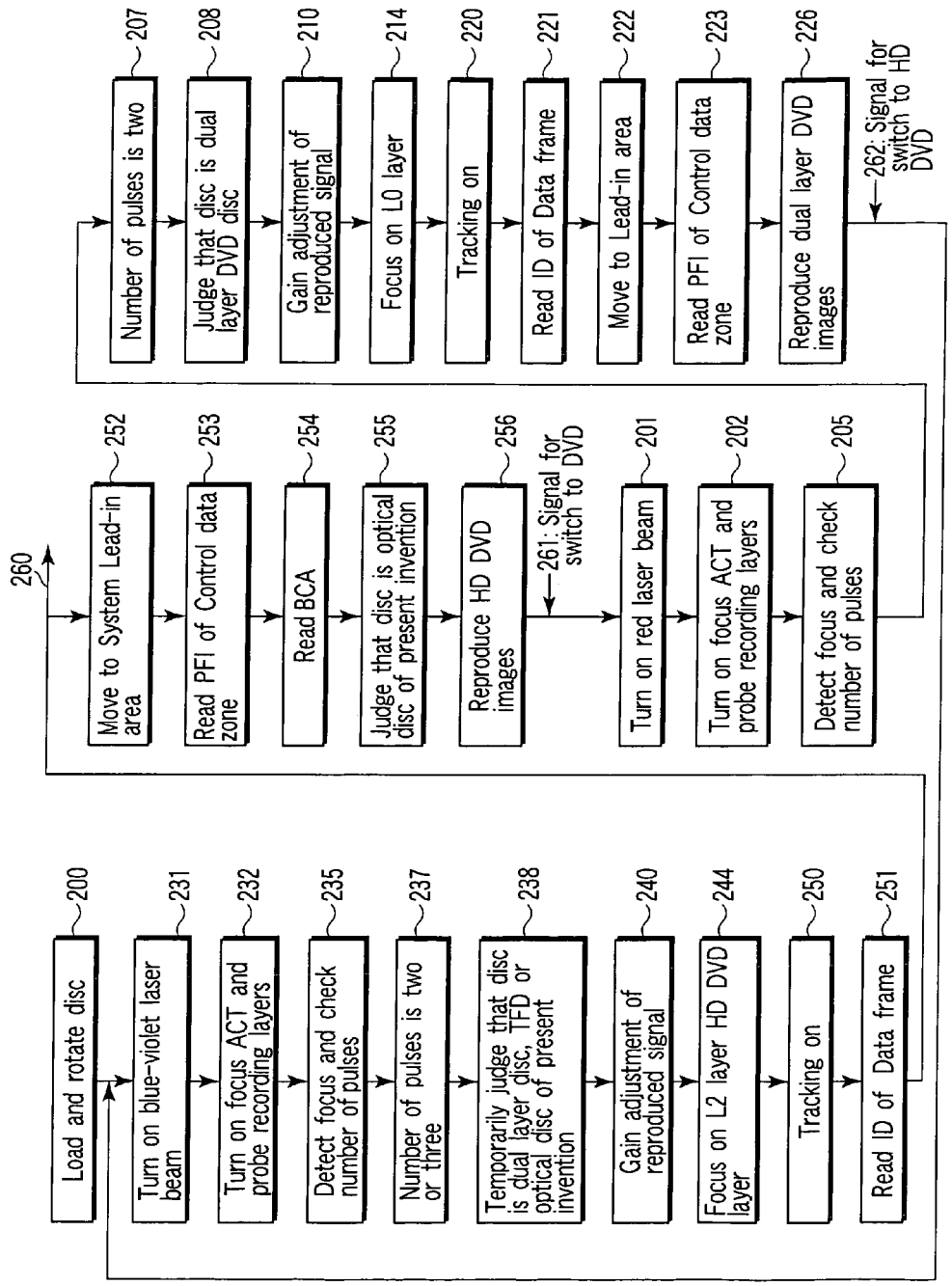
FIG. 27 is an exemplary diagram showing an operation flow of the DVD/DVD compatible player complying with the optical disc.

Next, a compatible apparatus according to the present invention using both the blue-violet laser beam and the red laser beam will be explained using FIGS. 26 and 27. FIG. 26 shows the configuration of the compatible apparatus. FIG. 27 is a flowchart to help explain the operation of the compatible apparatus. The compatible player can selectively output the red laser beam and the blue-violet laser beam. The parts similar to those in the previously described players are given the same numerals.

First, a disc of the present invention is loaded in the compatible player, and the disc is rotated (in step 200 in FIG. 27). Next, the laser is turned on to move on to focusing/tracking, signal reproduction and image reproduction, wherein the blue-violet laser beam is first turned on (in step 231 in FIG. 27) to reproduce the images in the HD DVD layer.

The reproduction flow for the HD DVD image is the same as that in FIG. 23. The HD DVD layer (L2) 81 is focused on (in step 244 in FIG. 27). Then, the disc is tracked on (in step 250 in FIG. 27). The Data Frame ID, the PFI of the System Lead-in area, and the BCA are read, thereby judging that this disc is an optical disc of the present invention and reproducing the images of the HD DVD. The user can enjoy the HD DVD images using an input terminal 190.

Next, when the user specifies the playback of the DVD by use of the input terminal 190, the red laser is turned on by a signal 261 to switch to the DVD (in step 201 in FIG. 27). This is followed by the same operation flow as that in FIG. 20, so that a Focus Actuator (ACT) 116 is driven, the recording layer is probed (in step 202 in FIG. 27), the DVD layer (L0) 75 is focused on, and the disc is tracked on (in step 220 in FIG. 27), thereby reproducing the dual layer DVD images (in step 226 in FIG. 27).

Next, when the user again specifies the reproduction of the HD DVD by use of the input terminal 190, the blue-violet laser is turned on by a signal 262 to switch to the HD DVD reproduction (in step 231 in FIG. 27), such that the HD DVD images can be reproduced in a manner previously shown (in step 256 in FIG. 27).

As described above, according to the present invention, the HD DVD layer and the dual layer DVD can be formed in one optical disc. In the existing DVD apparatus, the dual layer DVD is played back. In the HD DVD apparatus compatible with the HD DVD standard, the HD DVD layer is played back. In the compatible apparatus according to the present invention, both the dual layer DVD and the HD DVD layer can be played back. It is thus possible to allow compatibility between a group of products of the existing DVD standard and a group of products of the new HD DVD standard, and also to accelerate a smooth spread of the HD DVD standard product group to general users.

OTHER EMBODIMENTS

In the embodiment described above, the translucent films of the first recording layer and the second recording layer are formed of an Ag alloy. However, if reflectivity and transmissivity can be selectively set for each of the two laser beams different in wavelength, the apparatus can be more efficiently operated.

For example, the first recording layer and the second recording layer can be formed of multiple interference films to set a more effective reflectivity.

<Summary of Basic Points in the Embodiment Described Above>

An optical disc according to the present invention is basically specified by the following items (1) to (8).

(1) The optical disc is a single-sided triple layer optical disc where a light transmission layer, a first recording layer and second recording layer accessed with a first laser beam, and a third recording layer accessed with a second laser beam are arranged in that order in the direction in which the laser beam enters.

(2) The first recording layer is positioned a minimum of 550 µm from a light incidence plane.

(3) The distance between the first recording layer and the third recording layer is a maximum of 72 µm.

(4) The distance between the second recording layer and the third recording layer is a minimum of 15 µm.

(5) The distance between the first recording layer and the second recording layer is about 31 to 40 µm.

(6) The reflectivities of the first recording layer and the second recording layer with respect to the first laser beam range from 18 to 27%, and the ratio therebetween is about 1.1 or less.

(7) The reflectivity of the third recording layer with respect to the first laser beam is below 6%.

(8) The areal recording density of the third recording layer is three times or more as high as the areal recording density of the first recording layer and the second recording layer.

Furthermore, an optical disc apparatus according to the present invention is specified by the following item (9):

(9) The reflectivity of the third recording layer with respect to the second laser beam is 14 to 24%.

Furthermore, the optical disc apparatus according to the present invention is specified by the following items (10) to (12):

(10) The first recording layer is formed in a first signal substrate.

(11) The second recording layer is formed, via a second space layer, on the third recording layer formed on a second substrate.

(12) The first signal substrate and the second signal substrate are bonded together in such a manner that the recording layer surfaces of the two substrates lie between the these substrates, thereby forming a first space layer.

Furthermore, the optical disc apparatus according to the present invention is specified by the following items (13) to (22):

(13) The apparatus reads information recorded on the optical disc.

(14) The optical disc is a single-sided triple layer optical disc where a light transmission layer, a first recording layer and second recording layer accessed with a first laser beam, and a third recording layer accessed with a second laser beam are arranged in that order in the direction in which the laser beam enters.

(15) The first recording layer is positioned a minimum of 550 µm from a light incidence plane.

(16) The distance between the first recording layer and the third recording layer is a maximum of 72 µm.

(17) The distance between the second recording layer and the third recording layer is a minimum of 15 µm.

(18) The distance between the first recording layer and the second recording layer is about 31 to 40 µm.

(19) The reflectivities of the first recording layer and the second recording layer with respect to the first laser beam range from 18 to 27%, and the ratio therebetween is about 1.1 or less.

(20) The reflectivity of the third recording layer with respect to the first laser beam is below 6%.

(21) The areal recording density of the third recording layer is three times or more as high as the areal recording density of the first recording layer and the second recording layer.

(22) The information reading apparatus comprises an optical head which can generate the first laser beam and the second laser beam, and control means for causing the first laser beam or the second laser beam to be selectively generated.

Furthermore, the optical disc apparatus according to the present invention can additionally implement the following item (23) on the basis of the above items:

(23) The control means selects the first laser beam or the second laser beam in accordance with a user input from a user interface.

Suitable combinations of a plurality of components disclosed in the embodiment described above permit various inventions to be formed. For example, some of all the components shown in the embodiment may be eliminated. Moreover, components in different embodiments may be suitably combined.

According to the embodiment described above, it is possible to provide an optical disc which enables a first recording layer and a second recording layer (corresponding to a dual layer DVD) to be accessed with a first laser beam (red laser light) and enables a third recording layer (corresponding to an HD DVD layer) to be accessed with a second laser beam (blue-violet laser light) from one side. Therefore a single optical disc can contain both movie contents for the currently widespread single-sided dual layer DVD disc, and movie content for the HD DVD. As a result, it is possible to record on this optical disc most of the movie content (generally consisting of a feature film and bonus content) which have already been provided or which will be provided in DVDs, thereby providing a real combination disc which can deal with both SD images and HD images.

Furthermore, DVD content is reproduced in a conventional DVD compatible optical disc apparatus. In the new HD DVD compatible optical disc apparatus, it is possible to reproduce the movie content for HD DVD or both the movie content for HD DVD and the movie content for DVD.

For example, identical movie content is prepared as DVD content and HD DVD content, and if the two kinds of movie contents are recorded on a single optical disc, a user who has a DVD compatible apparatus alone can see the DVD movie content, while a user who has an HD DVD compatible apparatus can see the HD DVD movie content.

If the user who does not presently have an HD DVD compatible apparatus purchases an HD DVD compatible apparatus in the future, he/she can enjoy the HD images with an already purchased optical disc without newly purchasing an HD DVD disc, which is a great advantage to the user.

Furthermore, in the optical disc of the present invention, the layer crosstalk from the HD DVD layer is below 6%, so that when the DVD layer is accessed with the red laser light, it is possible to solve the problem caused in the Twin format disc that the DVD layer cannot be read in some DVD apparatuses.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A single-sided triple layer optical disc comprising: a light transmission layer; a first recording layer and a second recording layer which are accessed with a first laser beam; and a third recording layer which is accessed with a second laser beam, these layers being arranged in that order in a direction in which the laser beams enter, wherein
    the first recording layer is positioned a minimum of 550 μm from a light incidence plane,
    the distance between the first recording layer and the third recording layer is a maximum of 72 μm,
    the distance between the second recording layer and the third recording layer is a minimum of 15 μm,
    the distance between the first recording layer and the second recording layer is about 31 to 40 μm,
    the reflectivities of the first recording layer and the second recording layer with respect to the first laser beam range from 18 to 27%, the ratio therebetween being about 1.1 or less,
    the reflectivity of the third recording layer with respect to the first laser beam is below about 6%, and
    the areal recording density of the third recording layer is three times or more as high as the areal recording density of the first recording layer and the second recording layer.

2. The optical disc according to claim 1, wherein the reflectivity of the third recording layer with respect to the second laser beam is 14 to 24%.

3. A method of manufacturing an optical disc according to claim 1, the method comprising: preparing a first signal substrate where a first recording layer is formed; forming a second recording layer, via a second space layer, on a third recording layer formed on a second substrate; and bonding the first signal substrate and the second signal substrate in such a manner that the recording layer surfaces of the two substrates lie between these substrates, thereby forming a first space layer.

4. An optical disc apparatus which reads information recorded on an optical disc,
    the optical disc being a single-sided triple layer optical disc comprising: a light transmission layer; a first recording layer and a second recording layer which are accessed with a first laser beam; and a third recording layer which is accessed with a second laser beam, these layers being arranged in that order in a direction in which the laser beams enter, wherein
    the first recording layer is positioned a minimum of 550 μm from a light incidence plane,
    the distance between the first recording layer and the third recording layer is a maximum of 72 μm,
    the distance between the second recording layer and the third recording layer is a minimum of 15 μm,
    the distance between the first recording layer and the second recording layer is about 31 to 40 μm,
    the reflectivities of the first recording layer and the second recording layer with respect to the first laser beam range from 18 to 27%, the ratio therebetween being about 1.1 or less,
    the reflectivity of the third recording layer with respect to the first laser beam is below about 6%, and
    the areal recording density of the third recording layer is three times or more as high as the areal recording density of the first recording layer and the second recording layer;
    the information reading apparatus comprising:
    an optical head which is configured to generate the first laser beam and the second laser beam; and
    control means for causing the first laser beam or the second laser beam to be selectively generated.

5. The optical disc apparatus according to claim 4, wherein the control means selects the first laser beam or the second laser beam in accordance with a user input by a user interface.

* * * * *